United States Patent
Mikami

(10) Patent No.: US 8,159,724 B2
(45) Date of Patent: *Apr. 17, 2012

(54) IMAGE PROCESSING APPARATUS, METHOD, AND PROGRAM FOR APPLYING SECURITY PROCESSING RELATING TO A SELECTED IMAGE

(75) Inventor: Fumio Mikami, Chigasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,832

(22) Filed: Sep. 16, 2011

(65) Prior Publication Data

US 2012/0002900 A1 Jan. 5, 2012

Related U.S. Application Data

(63) Continuation of application No. 13/099,478, filed on May 3, 2011, now Pat. No. 8,040,572, which is a continuation of application No. 12/557,605, filed on Sep. 11, 2009, now Pat. No. 7,961,358, which is a continuation of application No. 11/612,285, filed on Dec. 18, 2006, now Pat. No. 7,619,782.

(30) Foreign Application Priority Data

Dec. 22, 2005 (JP) .................. 2005-370894

(51) Int. Cl.
*H04N 1/387* (2006.01)
*H04N 1/44* (2006.01)
*B41M 3/10* (2006.01)
*B41M 3/14* (2006.01)
*G07F 7/00* (2006.01)

(52) U.S. Cl. ......... 358/3.28; 358/1.14; 358/450; 726/26

(58) Field of Classification Search .................. 358/1.9, 358/3.24, 3.28, 1.14, 1.18, 450, 468; 283/113, 283/902; 399/366; 382/100; 340/5.1, 5.2, 340/5.86; 726/26, 32

See application file for complete search history.

(56) References Cited

U.S. PATENT DOCUMENTS

| 5,309,245 | A | 5/1994 | Hayashi et al. |
| 6,512,915 | B2 | 1/2003 | Matsunoshita et al. |
| 7,027,613 | B2 | 4/2006 | Spierenburg |

(Continued)

FOREIGN PATENT DOCUMENTS

JP 4-247561 A 9/1992

(Continued)

OTHER PUBLICATIONS

Office action issued in corresponding Japanese patent application No. 2005-370894, dated Mar. 31, 2008.

*Primary Examiner* — Scott A Rogers

(74) *Attorney, Agent, or Firm* — Rossi, Kimms & McDowell LLP

(57) ABSTRACT

A processing apparatus, method, and medium storing a computer program that combine two or more designated images (S1254), and input the type of security process to be performed for the combined image (S1253). The security process is performed for the combined image using the information associated with the input type of security process (S1255).

12 Claims, 16 Drawing Sheets

| U.S. PATENT DOCUMENTS | | | | FOREIGN PATENT DOCUMENTS | | |
|---|---|---|---|---|---|---|
| 7,099,050 B2 | 8/2006 | Motoyama | JP | 11-179982 A | 7/1999 |
| 7,221,484 B2 | 5/2007 | Motoyama | JP | 2001-324898 A | 11/2001 |
| 7,450,895 B2 | 11/2008 | Oomura et al. | JP | 2002-232617 A | 8/2002 |
| 2006/0061798 A1 | 3/2006 | Takahashi | JP | 2005-151030 A | 6/2005 |
| 2009/0147292 A1 | 6/2009 | Shimura et al. | JP | 2005-210538 A | 8/2005 |
| 2009/0147316 A1 | 6/2009 | Kaneda | JP | 2005-271500 A | 10/2005 |

FIG. 3

```
┌─────────────────────────────────────────────┐
│ REGISTER                                    │
│                                             │
│ MFP ─────────────────────────────────────── │
│     NAME : [ MFP-1        ▼]                │
│     STATE : READY      301                  │
│                                             │
│ REGISTRATION RANGE ──────────────────────── │
│     ⊙ ALL                                   │
│     ○ CURRENT PAGE                          │
│     ○ PAGE DESIGNATION  START [1]  END [5]  │
│                                             │
│                                    304      │
│ ADDITIONAL INFORMATION ─────────────────── │
│  302─⊙ COPY-FORGERY-INHIBITED [COPY INHIBITION ▼]
│       PATTERN                 [CONFIDENTIAL]│
│                                             │
│  303─○ DIGITAL      DIGITAL WATERMARK [¥¥c¥test¥folder]─306
│       WATERMARK     INFORMATION FILE        │
│                                   [REFER]─307
│                                             │
│                            [ OK ] [CANCEL]  │
└─────────────────────────────────────────────┘
                               308
```

VISUALIZATION

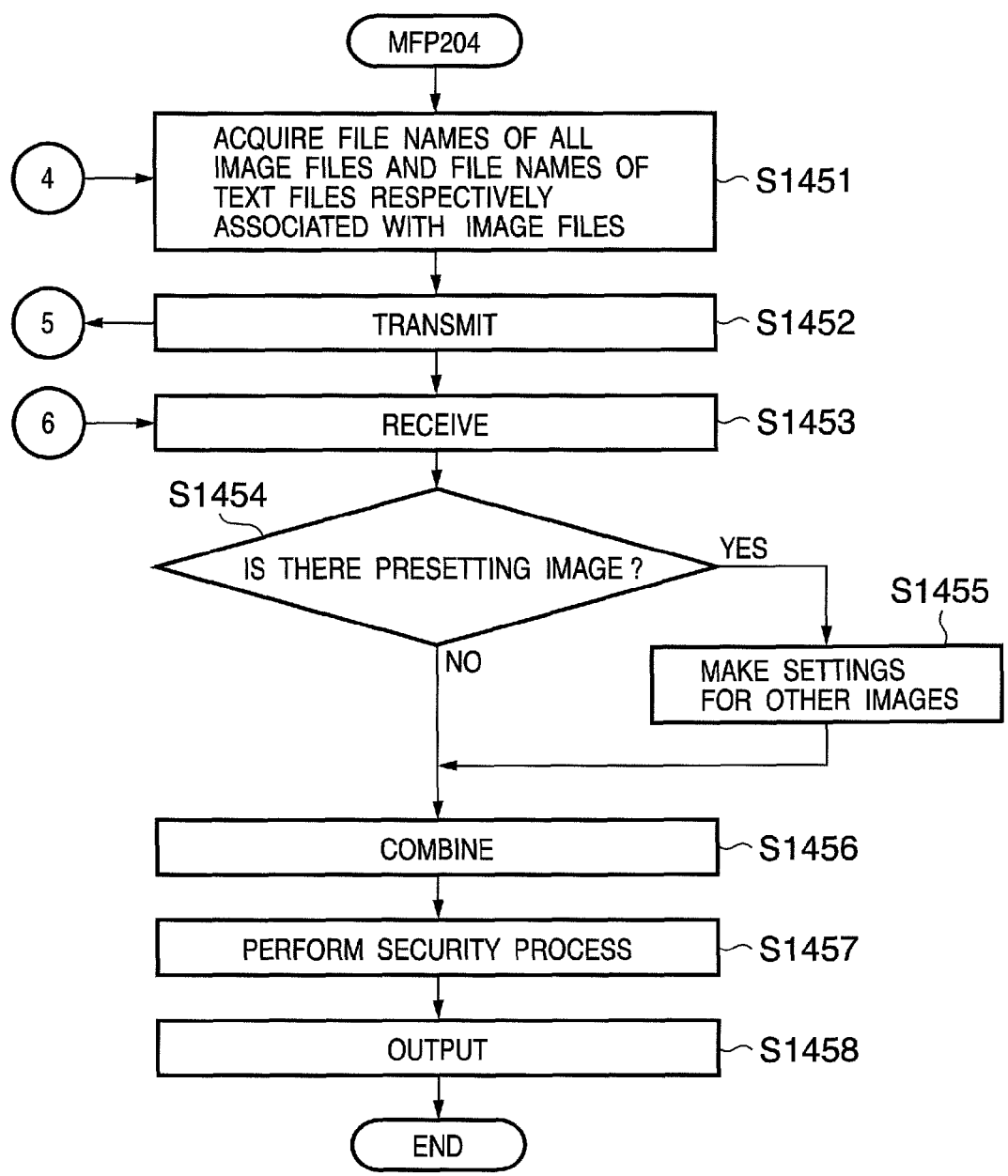

IMAGE PROCESSING APPARATUS, METHOD, AND PROGRAM FOR APPLYING SECURITY PROCESSING RELATING TO A SELECTED IMAGE

CROSS REFERENCE TO RELATED APPLICATION

This is a continuation of U.S. patent application Ser. No. 13/099,478 filed 3 May 2011, which is a continuation of Ser. No. 12/557,605 filed on 11 Sep. 2009, now U.S. Pat. No. 7,961,358, which is a continuation of Ser. No. 11/612,285 filed 18 Dec. 2006, now U.S. Pat. No. 7,619,782, the entire contents of which are herein incorporated by reference.

BACKGROUND OF THE INVENTION

1. Field of the Invention

The present invention relates to a technique of combining a plurality of images.

2. Description of the Related Art

Recently, various techniques associated with security have been proposed. Japanese Patent Laid-Open No. 2001-324898 discloses a security technique of composing a copy-forgery-inhibited pattern image with an original image. Japanese Patent Laid-Open No. 11-179982 discloses a security technique of composing a digital watermark image with an original image. Japanese Patent Laid-Open No. 2005-151030 discloses a security technique of encrypting an original image.

Even if a user wants to combine a plurality of images to which a plurality of different security processes are to be respectively applied, it cannot help but combine the respective images upon application of different security processes to them. For this reason, the combined image obtained after combining these images becomes an image with nonuniform security levels, e.g., an image having some parts with a high security level and other parts with a low security level. For example, when a copy-forgery-inhibited pattern image is composed with a first image, and a digital watermark image in which tracking information is embedded is composed with a second image, combining these images results in a combined image with different pages having different security levels. In addition, this combined image differs from an image requested by the user even from an aesthetic point of view. Assume that a copy-forgery-inhibited pattern image is composed with a first image, and nothing is composed with a second image. In this case, combining these images into one file only results in obtaining a combined image with different pages having different security levels. Furthermore, this combined image is not an image requested by the user even from an aesthetic point of view.

The present invention has been made in consideration of the above problem, and has as its object to provide an image processing apparatus which can combine a plurality of images, to which a plurality of different types of processes are to be applied, in the manner desired by a user.

SUMMARY OF THE INVENTION

According to the first aspect of the present invention, the foregoing object is attained by providing an image processing apparatus comprising:

determination unit adapted to determine whether a presetting image which presets, as a composing target, a security image designated as a composing target for each of a plurality of images which are designated to be combined exists among the plurality of images;

setting unit adapted to make setting to compose a security image with an image other than the presetting image and to output the composed image, when the determination unit determines that the presetting image exists; and a combining unit adapted to combine the image, which is set by the setting unit to compose with a security image and to output, with the presetting image.

According to the second aspect of the present invention, the foregoing object is attained by providing an image processing apparatus comprising:

combining unit adapted to obtain a third image by combining a first image for which setting is made to perform a first process with a second image for which setting is made to perform a second process; and processing unit adapted to perform at least one of the first process and the second process for the third image obtained by the combining unit.

According to the third aspect of the present invention, the foregoing object is attained by providing an image processing apparatus comprising:

combining unit adapted to obtain a third image by combining a first image with which first process information is associated with a second image with which second process information is associated; and processing unit adapted to perform a process based on at least one of the first process information and the second process information for the third image obtained by the combining unit.

According to the fourth aspect of the present invention, the foregoing object is attained by providing an image processing method comprising:

a determination step of determining whether a presetting image which presets, as a composing target, a security image designated as a composing target for each of a plurality of images which are designated to be combined exists among the plurality of images;

a setting step of making setting to compose a security image with an image other than the presetting image and to output the composed image, when it is determined in the determination step that the presetting image exists; and a combining step of combining the image which is set in the setting step to compose with a security image and to output, with the presetting image.

According to the fifth aspect of the present invention, the foregoing object is attained by providing an image processing method comprising:

a combining step of obtaining a third image by combining a first image for which setting is made to perform a first process with a second image for which setting is made to perform a second process; and a processing step of performing at least one of the first process and the second process for the third image obtained in the combining step.

According to the sixth aspect of the present invention, the foregoing object is attained by providing an image processing method comprising:

a combining step of obtaining a third image by combining a first image with which first process information is associated with a second image with which second process information is associated; and a processing step of performing a process based on at least one of the first process information and the second process information with respect to the third image obtained in the combining step.

According to the seventh aspect of the present invention, the foregoing object is attained by providing an image processing method comprising:

a first holding step of holding an image group;

a second holding step of holding information associated with a security process which is performed to protect security of an image;

a combining step of combining not less than two designated images of the image group held in the first holding step;

an input step of inputting a type of security process, of security processes corresponding to pieces of information held in the second holding step, which is performed for the images combined in the combining step; and a processing step of performing a security process for the images combined in the combining step by using information, of the pieces of information held in the second holding step, which is associated with security process having the type input in the input step.

According to the eighth aspect of the present invention, the foregoing object is attained by providing an image processing method comprising:

a holding step of holding a plurality of sets each including an image and information associated with a security process which is performed to protect security of the image;

a combining step of combining not less than two designated images of an image group held in the holding step;

an input step of inputting a type of security process to be performed for the images combined in the combining step;

a processing step of performing a security process for the images combined in the combining step by using information, of the respective pieces of information held in the holding step in sets with the not less than two images, which is associated with security process having the type input in the input step; and a management step of managing the combined image for which the security process has been performed in the processing step and the information associated with security process having the type input in the input step in association with each other.

According to the ninth aspect of the present invention, the foregoing object is attained by providing an image processing apparatus comprising:

first holding unit adapted to hold an image group;

second holding unit adapted to hold information associated with a security process which is performed to protect security of an image;

combining unit adapted to combine not less than two designated images of the image group held by the first holding unit;

input unit adapted to input a type of security process, of security processes corresponding to pieces of information held by the second holding unit, which is performed for the images combined by the combining unit; and processing unit adapted to perform a security process for the images combined by the combining unit by using information, of the pieces of information held by the second holding unit, which is associated with security process having the type input by the input unit.

According to the 10th aspect of the present invention, the foregoing object is attained by providing an image processing apparatus comprising:

holding unit adapted to hold a plurality of sets each including an image and information associated with a security process which is performed to protect security of the image;

combining unit adapted to combine not less than two designated images of an image group held by the holding unit;

input unit adapted to input a type of security process to be performed for the images combined by the combining unit;

a processing unit adapted to perform a security process for the images combined by the combining unit by using information, of the respective pieces of information held by the holding unit in sets with the not less than two images, which is associated with security process having the type input by the input unit; and a management unit adapted to manage the combined image for which the security process has been performed by the processing unit and the information associated with security process having the type input by the input unit in association with each other.

Further features of the present invention will become apparent from the following description of exemplary embodiments with reference to the attached drawings.

BRIEF DESCRIPTION OF THE DRAWINGS

FIG. 3 is a view showing an example of the display of a GUI for designating an image to be transmitted (registered) to an MFP 204 and for designating the type of security process for the image;

FIGS. 14A and 14B are flowcharts showing processes to be performed by a client terminal apparatus 203 and an MFP 204, respectively, when combining desired image files of the image files registered in the MFP 204 and performing a desired security process for the combined image file.

DESCRIPTION OF THE EMBODIMENTS

The preferred embodiments of the present invention will be described in detail with reference to the accompanying drawings.

[First Embodiment]

<System Configuration>

Figure 2:
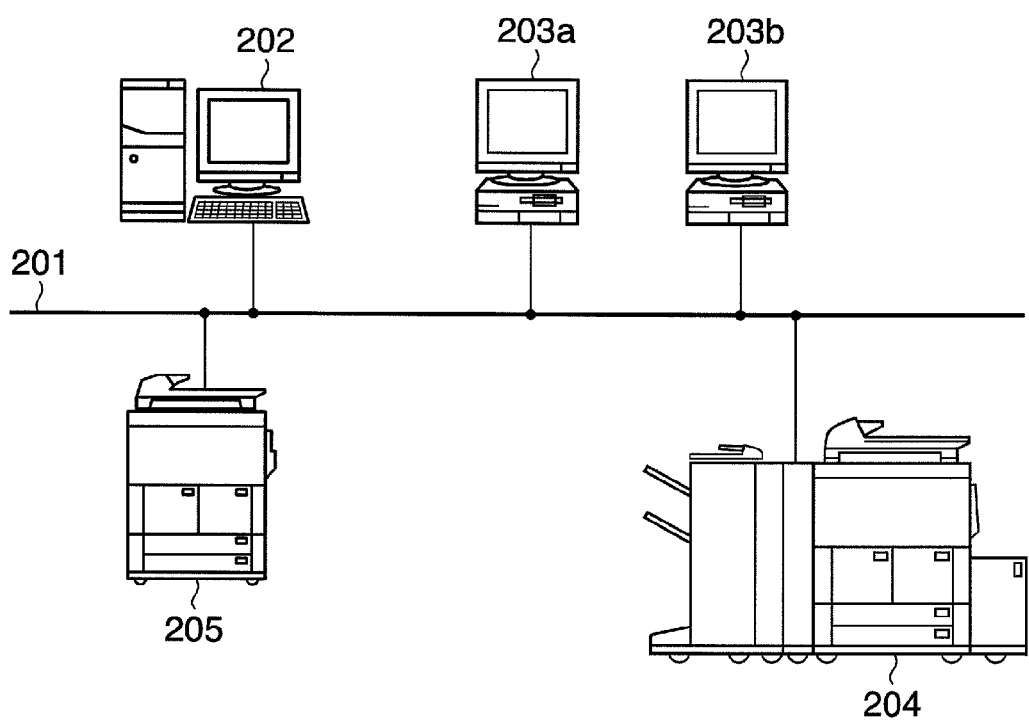
FIG. 2 is a view showing an example of the schematic configuration of a system according to the second embodiment of the present invention.

FIG. 2 is a view showing an example of the schematic configuration of a system according to the first embodiment.

As shown in FIG. 2, the system according to this embodiment comprises a server apparatus 202, client terminal apparatuses 203a and 203b, and MFPs (Multi Function Peripherals) 204 and 205, which connect to a network 201. These components constituting the system according to this embodiment will be described below.

The server apparatus 202 serves to manage the overall system, and holds various kinds of data which are generated on the client terminal apparatus 203a/203b side and uploaded.

The client terminal apparatuses 203a and 203b serve to create/edit various kinds of documents/graphic patterns by operating application software for executing so-called DTP (Desk Top Publishing). These apparatuses then convert the created documents/graphic patterns into PDL (Page Description Language) data and transmit the data to the MFP 204 and the MFP 205 through the network 201 in accordance with operation instructions from operators. In the following description, the client terminal apparatuses 203a and 203b will be generically called client terminal apparatuses 203.

The MFPs 204 and 205 are color MFPs which can perform scanning, printing, and the like in full color. The network 201 comprises a network such as a LAN or the Internet. The server apparatus 202, client terminal apparatus 203, and MFPs 204 and 205 can communicate data with each other through the network 201.

Note that this embodiment is not limited to the system configuration shown in FIG. 2. That is, the embodiment is not limited to the configuration, the number, and the like of apparatuses of the system.

<Hardware Configuration of Client Terminal Apparatus 203>

Figure 8:
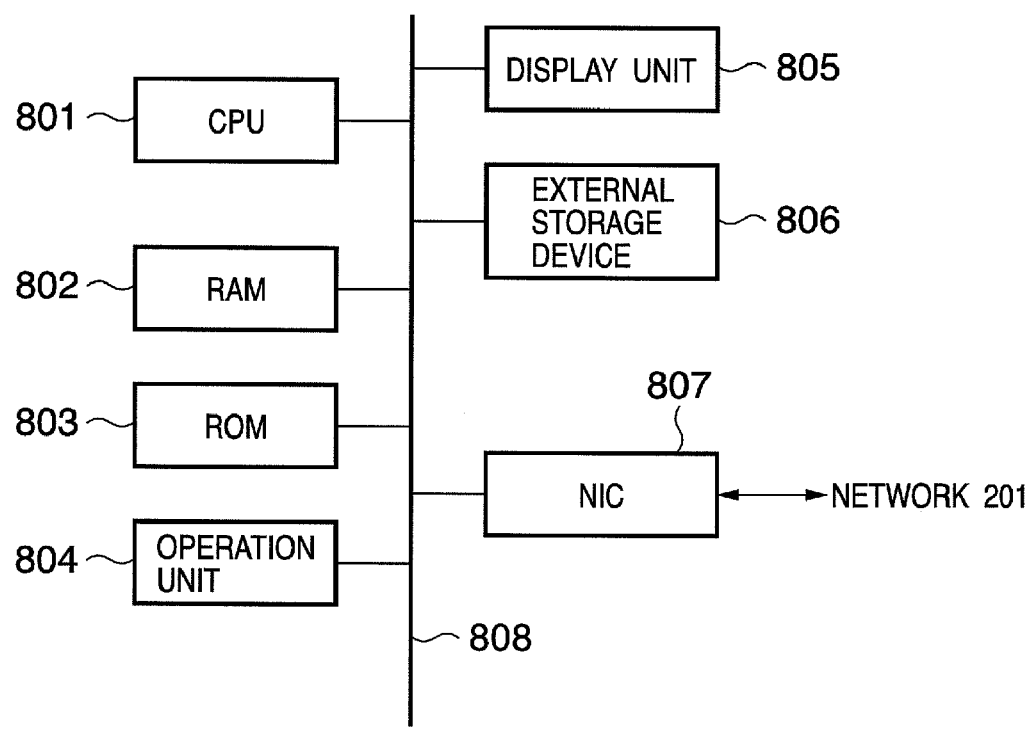
FIG. 8 is a block diagram showing the hardware configuration of a client terminal apparatus 203.

FIG. 8 is a block diagram showing the hardware configuration of the client terminal apparatus 203. Note that this embodiment can use a computer such as a general PC (personal computer) or WS (workstation) as the client terminal apparatus 203.

Reference numeral 801 denotes a CPU, which controls the overall client terminal apparatus 203 and executes each process to be described later which the client terminal apparatus 203 executes, by using programs and data stored in a RAM 802 and a ROM 803.

The RAM 802 has an area for temporarily storing the program and data loaded from an external storage device 806, data externally received through a NIC (network interface controller) 807, and the like. The RAM 802 also has a work area used when the CPU 801 executes various types of processes. The RAM 802 can provide various areas, as needed.

The ROM 803 stores setting data, a boot program, and the like for the client terminal apparatus 203.

Reference numeral 804 denotes an operation unit, which comprises a keyboard, a mouse, and the like, and can input various kinds of instructions to the CPU 801 by being operated by the operator of the client terminal apparatus 203.

Reference numeral 805 denotes a display unit, which comprises a CRT, a liquid crystal screen, or the like, and can display the processing result obtained by the CPU 801 by using images, characters, and the like.

The external storage device 806 is a large-capacity information storage device typified by a hard disk drive unit. The external storage device 806 stores in advance an OS (Operating System) and programs and data which make the CPU 801 execute processes (to be described later) to be performed by the client terminal apparatus 203. These programs and data are loaded into the RAM 802 under the control of the CPU 801, as needed.

The NIC 807 serves to connect the client terminal apparatus 203 to the network 201. The client terminal apparatus 203 communicates data with each apparatus connecting to the network 201 through the NIC 807.

Reference numeral 808 denotes a bus which connects the above components to each other.

Note that the configuration shown in FIG. 8 is an example, and the hardware configuration of the client terminal apparatus 203 is not limited to that shown in FIG. 8 as long as the configuration basically allows the client terminal apparatus 203 to execute the respective processes to be described below.

<Functional Configurations of MFPs 204 and 205>

Figure 1:
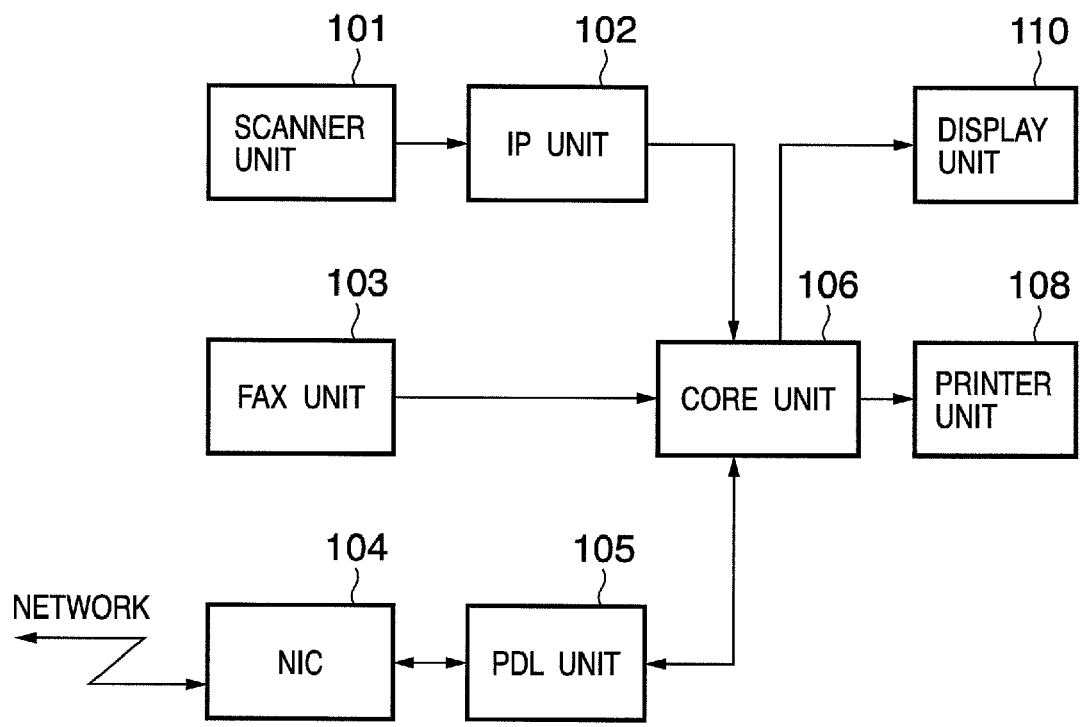
FIG. 1 is a block diagram showing the functional configurations of MFPs 204 and 205.

FIG. 1 is a block diagram showing the functional configuration of each of the MFPs 204 and 205. Note that each component shown in FIG. 1 is implemented by hardware or software as needed. The following description will be made on the assumption that the MFPs 204 and 205 have the same functional configuration, and hence the MFP 204 will be exemplified.

Reference numeral 101 denotes a scanner unit, which reads information recorded on a recording medium such as a sheet of paper as an image signal, and transmits the signal to an IP unit 102.

The IP (image processing) unit 102 A/D-converts the received image signal to obtain image data. The IP unit 102 then performs proper image processing for the image data and transmits the image processing result to a core unit 106 on the subsequent stage.

Reference numeral 103 denotes a FAX unit, which transmits/receives signals through a telephone line typified by a facsimile line or the like. Upon externally receiving a signal, the FAX unit 103 A/D-converts the received signal and transmits the resultant signal as data to the core unit 106 on the subsequent stage.

Reference numeral 104 denotes a NIC, which connects the MFP 204 to the network 201. The MFP 204 communicates data with each apparatus connecting to the network 201 through the NIC 104.

Reference numeral 105 denotes a PDL unit. Upon receiving PDL (Page Description Language) data from the client terminal apparatus 203, the PDL unit 105 bitmaps the data into an image, and transmits the bitmapping result to the core unit 106.

The core unit 106 controls the overall MFP 204 and also controls each component of the MFP 204. The core unit 106 transmits data received from the IP unit 102, FAX unit 103, or PDL unit 105 to a display unit 110 or printer unit 108 on the subsequent stage in accordance with an instruction from the client terminal apparatus 203.

The display unit 110 displays an image based on the received data. The operator uses the display unit 110 to check the contents of an image without printing it, check (preview) the state of an image before printing it, or view a thumbnail.

The printer unit 108 prints an image based on received data on a recording medium such as a sheet.

Figure 11:
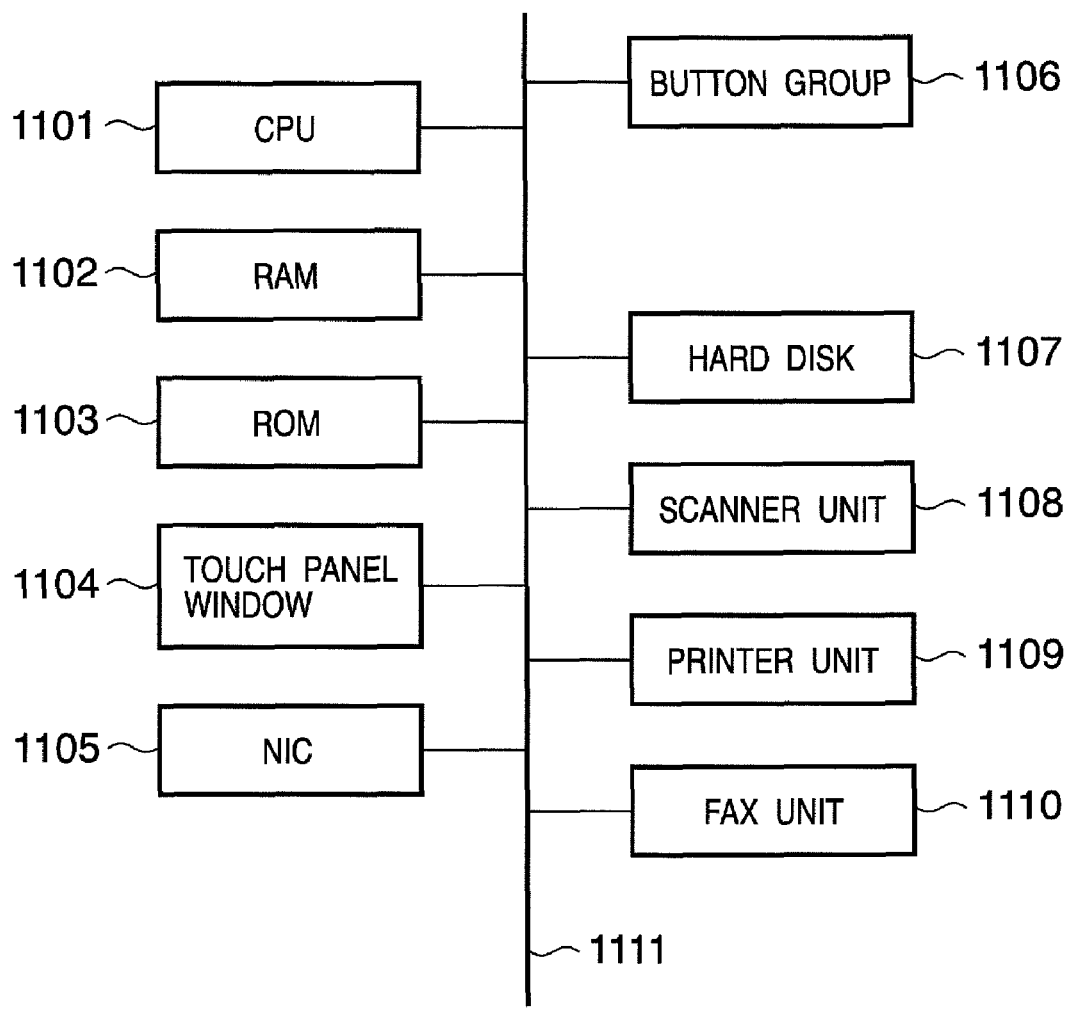
FIG. 11 is a block diagram showing the hardware configuration of an MFP 204.

FIG. 11 is a block diagram showing the hardware configuration of the MFP 204 having the above functional configuration.

Reference numeral 1101 denotes a CPU, which controls the overall MFP 204 and executes each process (to be described later) to be performed by the MFP 204, by using programs and data stored in a RAM 1102 and a ROM 1103. In this embodiment, some or all functions of the IP unit 102, PDL unit 105, and core unit 106 shown in FIG. 1 are implemented in the form of programs, and the scanner unit 101 executes the programs to implement the respective functions.

As described above, however, it suffices to implement these functions by hardware as needed.

Checked up to here. Perfect translation, further checking is probably not necessary The RAM 1102 has an area for temporarily storing various kinds of data received from the client terminal apparatus 203 through the NIC 1105 and programs and data loaded from a hard disk 1107. The RAM 1102 also has a work area used when the CPU 1101 executes various types of processes.

The ROM 1103 stores in advance programs and data which make the CPU 1101 execute processes (to be described later) to be performed by the client terminal apparatus 203. These programs and data are loaded into the RAM 1102 under the control of the CPU 1101, as needed.

Reference numeral 1104 denotes a touch panel window, which corresponds to the display unit 110. The touch panel window 1104 can display various kinds of processing results by using images, characters, and the like, and allows the operator to input a desired instruction to the CPU 1101 by performing operation on the touch panel window 1104.

Reference numeral 1105 denotes a NIC, which corresponds to the NIC 104; and 1106, a button group, which comprises physical buttons and has a ten-key pad for designating, for example, the number of copies.

The hard disk 1107 stores an OS (Operating System) or the like, and also stores various kinds of data transmitted from the client terminal apparatus 203 through the network 201.

Reference numeral 1108 denotes a scanner unit, which corresponds to the scanner unit 101; 1109, a printer unit, which corresponds to the printer unit 108; 1110, a FAX unit, which corresponds to the FAX unit 103; and 1111, a bus which connects the above components to each other.

<IP Unit 102>

Figure 5:
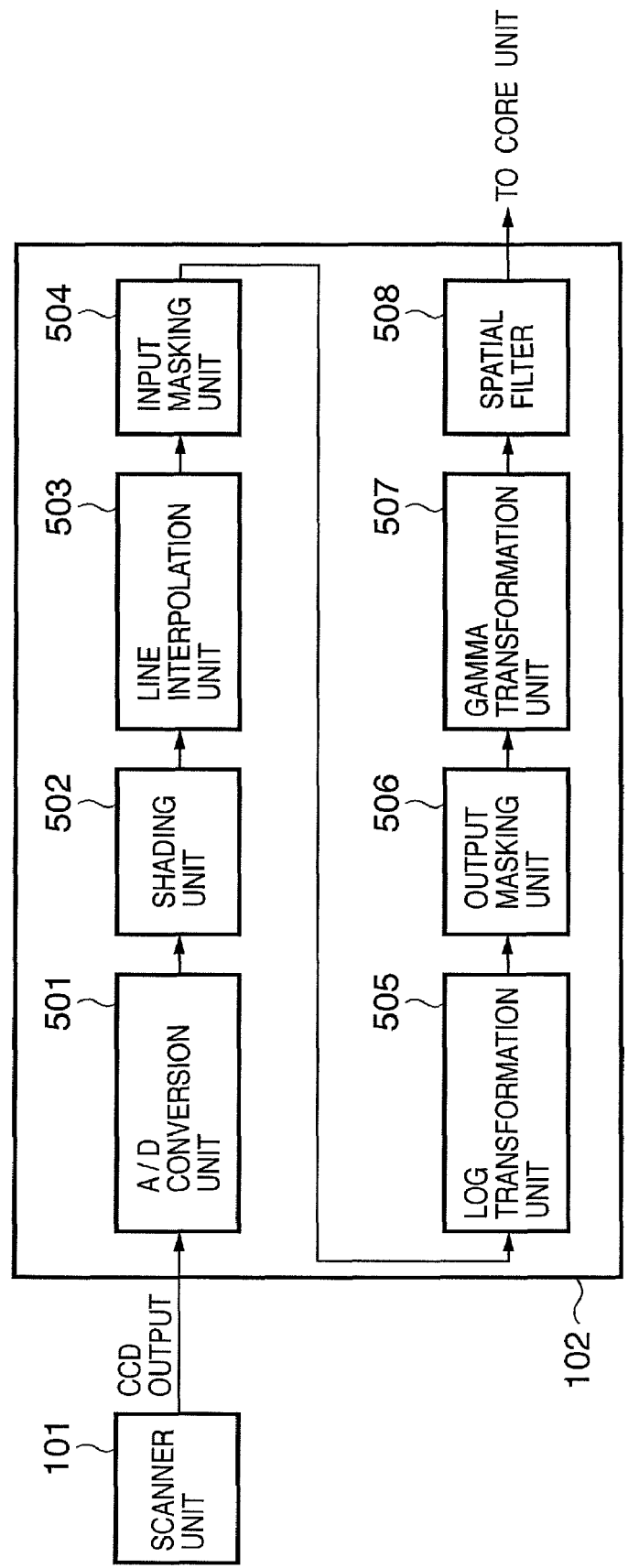
FIG. 5 is a block diagram showing the detailed functional configuration of an IP unit 102.

FIG. 5 is a block diagram showing the functional configuration of the IP unit 102 in detail. The CCD sensor of the scanner unit 101 converts an optical signal input to the scanner unit 101 into an electrical signal, and inputs it to an A/D conversion unit 501 of the IP unit 102. If this CCD sensor is an RGB three-line color sensor, the A/D conversion unit 501 receives R, G, and B image signals, and converts the respective color signals into 8-bit digital image data R0, G0, and B0, respectively.

The conversion results obtained by the A/D conversion unit 501, i.e., the data of R0, the data of G0, and the data of B0, are transmitted to a shading unit 502 on the subsequent stage. The shading unit 502 performs known shading correction for the received data of the respective colors by using read signals based on a reference white plate. The shading unit 502 transmits the correction results to a line interpolation unit (line delay adjustment circuit) 503 on the subsequent stage.

In this case, the line sensors of the respective colors of the CCD sensor which the scanner unit 101 has are spaced apart from each other by a predetermined distance. The line interpolation unit 503 corrects the spatial shift of an image in the sub-scanning direction on the basis of received data, and transmits the correction result to an input masking unit 504.

The input masking unit 504 converts a read color space determined by the spectral characteristics of the R, G, and B filters of the CCD sensor which the scanner unit 101 has into an NTSC standard color space. The input masking unit 504 therefore converts the (R0, G0, B0) data input from the line interpolation unit 503 into standard (R, G, B) data by performing 3×3 matrix operation using constants unique to the apparatus in consideration of various characteristics, e.g., the sensitivity characteristics of the CCD sensor and the spectral characteristics of the illumination lamp. The input masking unit 504 transmits the conversion result to a LOG transformation unit (luminance/density transformation unit) 505 on the subsequent stage.

The LOG transformation unit 505 comprises a lookup table (LUT), and transforms the R, G, and B data received from the input masking unit 504 into C1, M1, and Y1 data. An output masking unit 506 receives the data (the data of C1, M1, and Y1) of the transformation result obtained by the LOG transformation unit 505, corrects them into C, M, Y, K, LC, and LM signals (in this case, LC stands for light cyan, i.e., light-colored cyan, and LM stands for light magenta, i.e., light-colored magenta) as toner colors of the printer unit 108, and outputs them.

A gamma transformation unit 507 transforms the data received from the output masking unit 506 into C, M, Y, K, LC, and LM data for image output operation by using a lookup table (LUT) in consideration of the tint characteristics of toner and the density adjustment value input by the user. Finally, a spatial filter 508 performs edge enhancement or smoothing for the image in accordance with the received data, and transmits the processing result to the core unit 106.

<PDL Unit 105>

Figure 4:
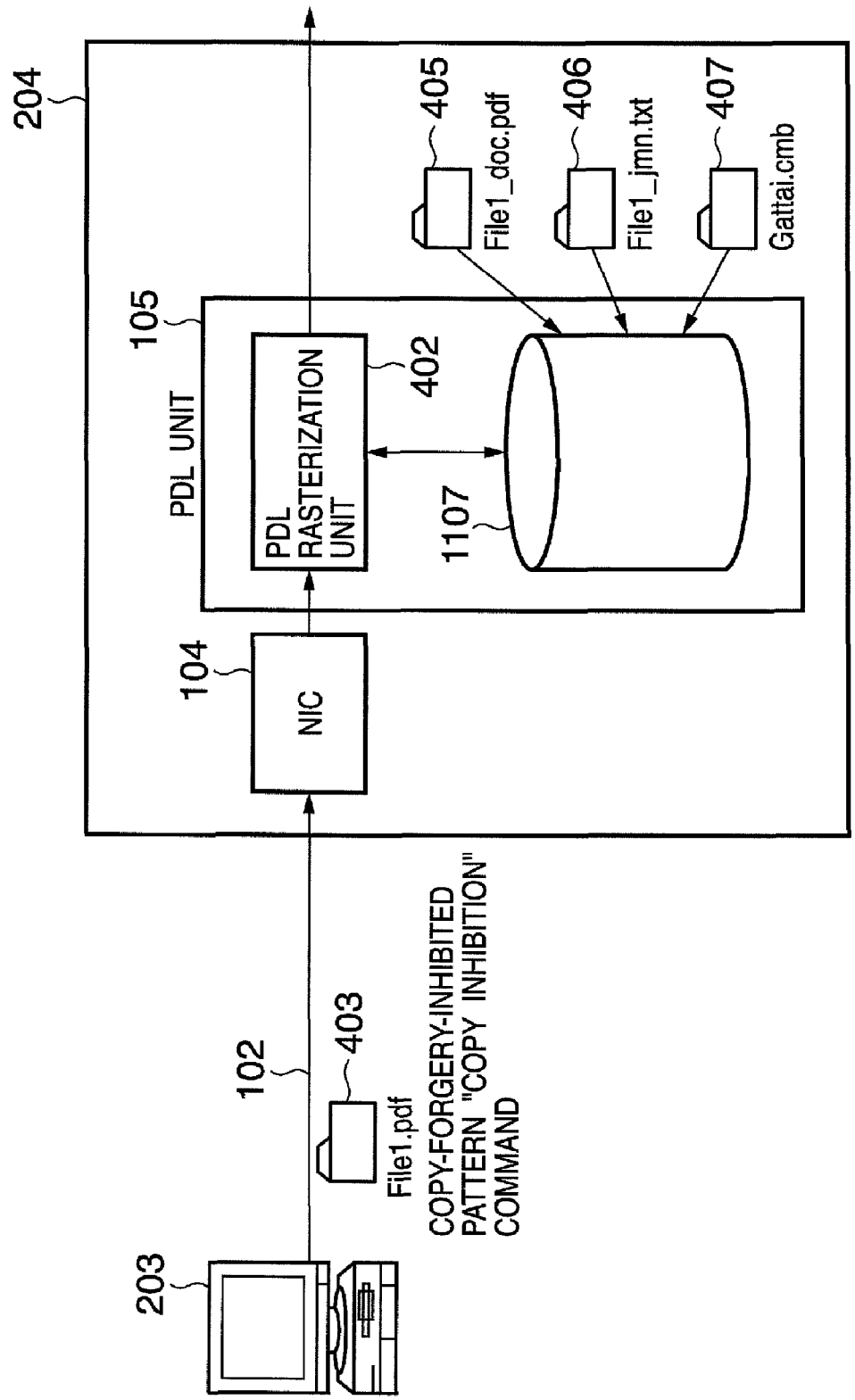
FIG. 4 is a view for explaining processing in a PDL unit 105.

FIG. 4 is a view for explaining processing in the PDL unit 105. Assume that in this embodiment, the client terminal apparatus 203 creates image data comprising documents, graphic patterns, photographs, and the like. When transmitting the data to the MFP 204, the client terminal apparatus 203 transmits the data to the MFP 204 upon transforming the data into PDL data typified by the PostScript (registered product) language available from Adobe.

As shown in FIG. 4, the PDL unit 105 includes a PDL rasterization unit 402. Upon receiving the PDL data from the client terminal apparatus 203 through the NIC 104, the PDL unit 105 performs RIP (Raster Image Processing) to convert the PDL data into raster image. More specifically, the PDL unit 105 temporarily stores the PDL data received from the client terminal apparatus 203 through the NIC 104 in the hard disk 1107, converts the data into a raster image, and manages/stores it for each job. The converted raster image data are stored in a memory capable of high-speed access for each of color components of C, M, Y, and K and for each job, and are set to the core unit 106 in accordance with the state of the printer unit 108.

The contents of processing by the PDL unit 105 will be briefly described below with reference to FIG. 4. This processing will be described in detail later with reference to FIG. 4.

<Core Unit 106>

The core unit 106 will be described next.

The core unit 106 functions to perform so-called traffic control in the use of the MFP 204. That is, bus switching is performed in accordance with various functions in the MFP 204, e.g., the copy function, network scan function, facsimile transmission/reception function, and display function.

The following shows a pattern of bus switching for the execution of the respective functions:

copy function: scanner unit 101→core unit 106→printer unit 108 network scan function: scanner unit 101→core unit 106→NIC 104 network printer: NIC 104→core unit 106→printer unit 108 facsimile transmission function: scanner unit 101→core unit 106→FAX unit 103 facsimile reception function: FAX unit 103→core unit 106→printer unit 108 display function: scanner unit 101 or FAX unit 103 or NIC 104→core unit 106→display unit 110

As described above, the image data output from the core unit 106 is transmitted to the printer unit 108 or the display unit 110.

<File Registration in MFP 204>

The following description concerns processing to be performed by the client terminal apparatus 203 and the MFP 204 when the client terminal apparatus 203 transmits the image data (file) to the MFP 204 through the network 201, and the MFP 204 registers the data.

Note that in this embodiment, in order to protect the security of an image to be registered in the MFP 204, the MFP 204 performs a security process for the image to be registered before it is registered. Before transmitting the image to the MFP 204, therefore, the operator of the client terminal apparatus 203 uses the GUI shown in FIG. 3 to designate the type of security process to be performed by the MFP 204.

FIG. 3 is a view showing an example of the display of the GUI for designating an image to be transmitted (registered) to the MFP 204 and the type of security process to be performed for the image. Note that the display unit 805 displays the GUI in FIG. 3 when the CPU 801 executes driver software for the MFP 204, which is stored in the external storage device 806 of the client terminal apparatus 203, upon loading it into the RAM 802. Assume that the operator issues operation instructions to the following GUIs including the GUI in FIG. 3 by operating the operation unit 804 which the client terminal apparatus 203 has. Assume also that the CPU 801 performs processing to be performed on the client terminal apparatus 203 side as a result of operating the GUI using the operation unit 804.

Reference numeral 301 in FIG. 3 denotes a tab for designating the registration destination of an image file. Designating this tab will display a menu displaying a list of apparatus names which can be selected as registration destinations. Selecting one of the apparatus names displayed on the menu makes it possible to designate the registration destination of the image. Referring to FIG. 3, "MFP-1" is selected as an output destination, which is the MFP 204.

Reference numerals 302 and 303 denote check buttons for selecting the type of security process to be performed on the MFP 204 side for the image transmitted to the MFP 204. The operator may designate the check box 302 if he/she wants to protect the security of a target image by composing a copy-forgery-inhibited pattern image with the target image. The operator may designate the check box 303 if he/she wants to protect the security of this image by embedding digital watermark information in the image (composing a digital watermark image with the target image). Assume that information about security is embedded in this digital watermark image. Information about security includes, for example, tracking information. This tracking information includes, for example, the name of a user who has generated an image, the serial number of an MFP storing an image, the name of a user who has stored an image, and the time at which an image is stored.

Reference numeral 304 denotes a tab which the operator can be operate when designating the check box 302 and allows the operator to select a character sequence to be embedded in a copy-forgery-inhibited pattern image. Designating this tab will display a menu displaying a list of character sequences which can be selected as copy-forgery-inhibited patterns. Selecting one of the character sequences displayed on this menu therefore makes it possible to designate a character sequence to be embedded in a copy-forgery-inhibited pattern image. Referring to FIG. 3, the character sequence "copy inhibition" is selected.

A copy-forgery-inhibited pattern image will be described below.

There has been available special paper called anti-counterfeit paper. A character sequence such as "COPY" is embedded in this anti-counterfeit paper so as not to be seen at a glance. This embedded character sequence emerges on a copy obtained by copying the anti-counterfeit paper. This makes it possible to easily discriminate a document created by using such anti-counterfeit paper from its copy. This can also make anybody hesitate to use a copy of the document.

Owing to such effect of anti-counterfeit paper, this paper has been used for the creation of a resident card, a business form, or the like. However, anti-counterfeit paper is more expensive than plain paper. Another problem is that only the character sequence embedded at the time of manufacture of paper emerges on a copy.

In such situation, a new technique which can obtain the same effect as that of anti-counterfeit paper has attracted attention. This is a technique of composing original data created by using a computer with a copy-forgery-inhibited pattern (sometimes called copy-restraining pattern) image data inside a printer and outputting the image data with the copy-forgery-inhibited pattern image obtained by the composing operation. Note that a character sequence or the like is embedded in this copy-forgery-inhibited pattern image. For this reason, the embedded character sequence emerges on a copy obtained by copying the image with the copy-forgery-inhibited pattern as in the case of anti-counterfeit paper. This technique has the merit of being capable of creating an original at a lower cost than using anti-counterfeit paper because of the use of plain paper. This technique also allows to create new copy-forgery-inhibited pattern image data every time an original is created. Therefore, the technique allows to freely set a color for a copy-forgery-inhibited pattern image, a character sequence to be embedded, and the like.

This copy-forgery-inhibited pattern image comprises a "remaining" area and a "disappearing" area (or an area becoming lighter in color than "the remaining area") on a copy. Note that the reflection densities in these two areas are the same on the original. This makes it impossible for the human eye to perceive that a character sequence such as "COPY" is embedded. In this case, "remaining" means that an image on an original is accurately reproduced on a copy, and "disappearing" means that an image on the original is not reproduced on the copy. Note that a reflection density meter measures reflection densities.

Subsequently, a "remaining area" on a copy will be referred to as a "latent area", and a "disappearing" area (or an area becoming lighter in color than "remaining area") will be referred to as a "background area".

Figure 9:
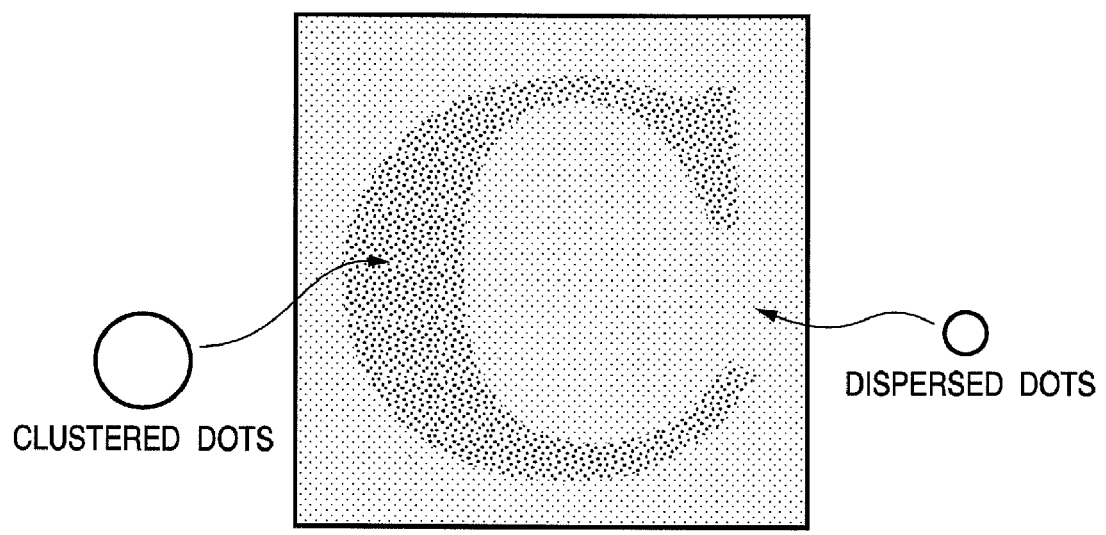
FIG. 9 is a view showing the state of dots in a copy-forgery-inhibited pattern image.

FIG. 9 is a view showing the state of dots in a copy-forgery-inhibited pattern image. Referring to FIG. 9, an area where dots are densely arranged is a latent area, and an area where dots are sparsely arranged is a background area. The dots in these two areas are generated by different halftone dot processes or different dither processes. For example, the dots in the latent area are generated by a halftone dot process with a low screen ruling, and the dots in the background area are generated by a halftone dot process with a high screen ruling. Alternatively, the dots in the latent area are generated by using a clustered-dot dither matrix, and the dots in the background area are generated by using a dispersed-dot dither matrix.

The reproduction performance of a copying machine depends on the input resolution and output resolution which the copying machine has. That is, the reproduction performance of the copying machine has its own limit. Assume that the dots in the latent area of a copy-forgery-inhibited pattern image are formed larger than those which can be reproduced by the copying machine and the dots in the background area are formed smaller than those which can be reproduced. In this case, in general, the dots in the latent area are reproduced on a copy, but the dots in the background area are difficult to reproduce on the copy. As a result, the latent area reproduced on the copy becomes darker than the background area. In the following description, making an embedded character sequence or the like look emerging by reproducing a latent area on a copy to be darker than a background area will be referred to as visualization.

Figure 10A:
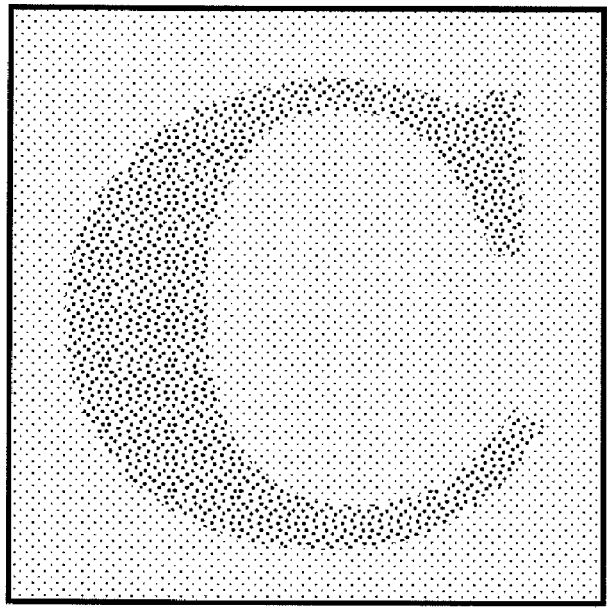
FIG. 10A is a view showing visualization.
Figure 10B:
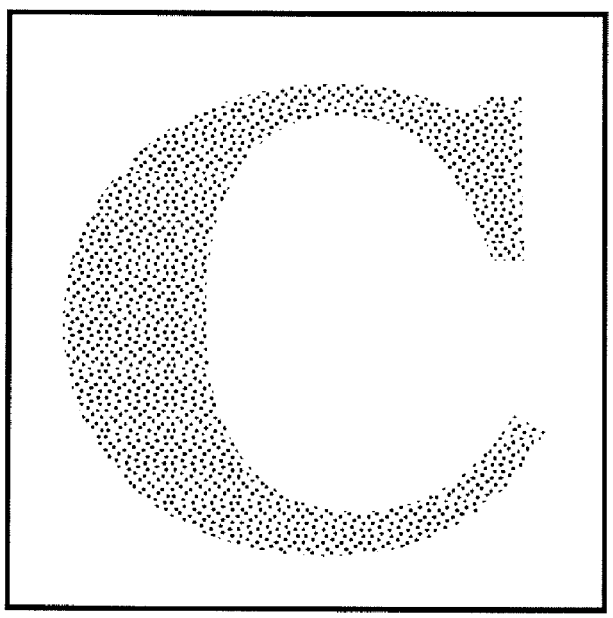
FIG. 10B is a view showing visualization.

FIGS. 10A and 10B are views showing this visualization. FIGS. 10A and 10B schematically show that clustered dots (large dots) are reproduced on a copy, and dispersed dots (small dots) are not accurately reproduced on the copy.

Note that a copy-forgery-inhibited pattern image is not limited to the above arrangement, and may be configured to make a character sequence like "COPY", a symbol, a pattern, or the like emerge (be visualized) on a copy so as to be recognizable by the human eye. Even if a character sequence like "COPY" is shown on a copy in an outlined state, the character sequence achieves the object. Obviously, in this case, the area of the character sequence "COPY" is referred to as a background area.

Referring back to FIG. 3, reference numeral 306 denotes a region which the operator can operate when designating the check box 303 and is used to input a path for a digital watermark information file. Note that designating a button 307 will display a window depicting a hierarchical directory structure in the external storage device 806, and hence performing known operation using the window makes it possible to select a desired file. In this case, various kinds of information can be thought of as information to be embedded as digital watermark information, e.g., the serial number of the MFP 204, the ID unique to the operator, the date, the time, and the like.

Reference numeral 308 denotes an OK button. Designating the OK button 308 after performing various types of setting processes by using the GUI in FIG. 3 makes the CPU 801 transmit various data set by the setting processes to the MFP 204.

Referring to FIG. 4, the image file transmitted from the client terminal apparatus 203 to the MFP 204 is an image file 403 whose file name is "File1.pdf". In addition, the information (associated with a security process) transmitted to the MFP 204, together with the image file 403, is a "command to add copy-forgery-inhibited pattern [copy inhibition]".

Processing to be performed when the MFP 204 receives the image file 403 and a command from the client terminal apparatus 203 will be described next with reference to FIG. 4.

When the MFP 204 receives the image file 403 and a command through the NIC 104, the PDL rasterization unit 402 changes the file name to "File1_doc.pdf" and stores the file as a file 405 in the hard disk 1107 without rasterizing the image file 403 at the time of file registration.

In addition, the MFP 204 creates a text file 406, with the file name "File1_jmn.txt", describing the font information of the character sequence "copy inhibition" and information (a superimposed pattern of character sequences or the like) associated with an overall copy-forgery-inhibited pattern by referring to the command received from the client terminal apparatus 203, together with the image file 403, and stores the file in the hard disk 1107.

With the above processing, the MFP 204 stores, in the hard disk 1107 thereof, the image file and text file transmitted from the client terminal apparatus 203 as files each having a file name containing the character sequence "File1". This character sequence associates these files with each other. Note that the respective file names and an association method are not limited to the above methods, and various other methods are conceivable.

Assume that the client terminal apparatus 203 has then transmitted an image file having the file name "File2.pdf" and information (a "command to embed digital watermark information") associated with a security process for the image file to the MFP 204.

In this case, the MFP 204 performs the same processing as that described above, i.e., storing, in the hard disk 1107, the image file having the file name "File2.pdf" as a file having the file name "File2_doc.pdf". In addition, the MFP 204 stores, in the hard disk 1107, the command transmitted to the MFP 204, together with this image file, as a text file having the file name "File_jmn.txt". The file having the file name "File2_jmn.txt" describes embedded information, e.g., the data of an image or character used as digital watermark information, an embedding position, and an embedding size.

Note that when registering a file containing images over a plurality of pages in the MFP 204, it suffices to designate pages to be registered on the GUI.

With the above processing, the MFP 204 stores the image file transmitted from the client terminal apparatus 203 in the hard disk 1107 which the MFP 204 has, and also stores, as a text file, information associated with a security process to be performed for the image file. The image file and the text file are associated with each other by making them have file names containing a shared character sequence.

<File Combining>

The next description is about the processing of combining image files, of the plurality of image files registered in the hard disk 1107 of the MFP 204 by the above registration processing, which are designated by the client terminal apparatus 203.

Figure 6:
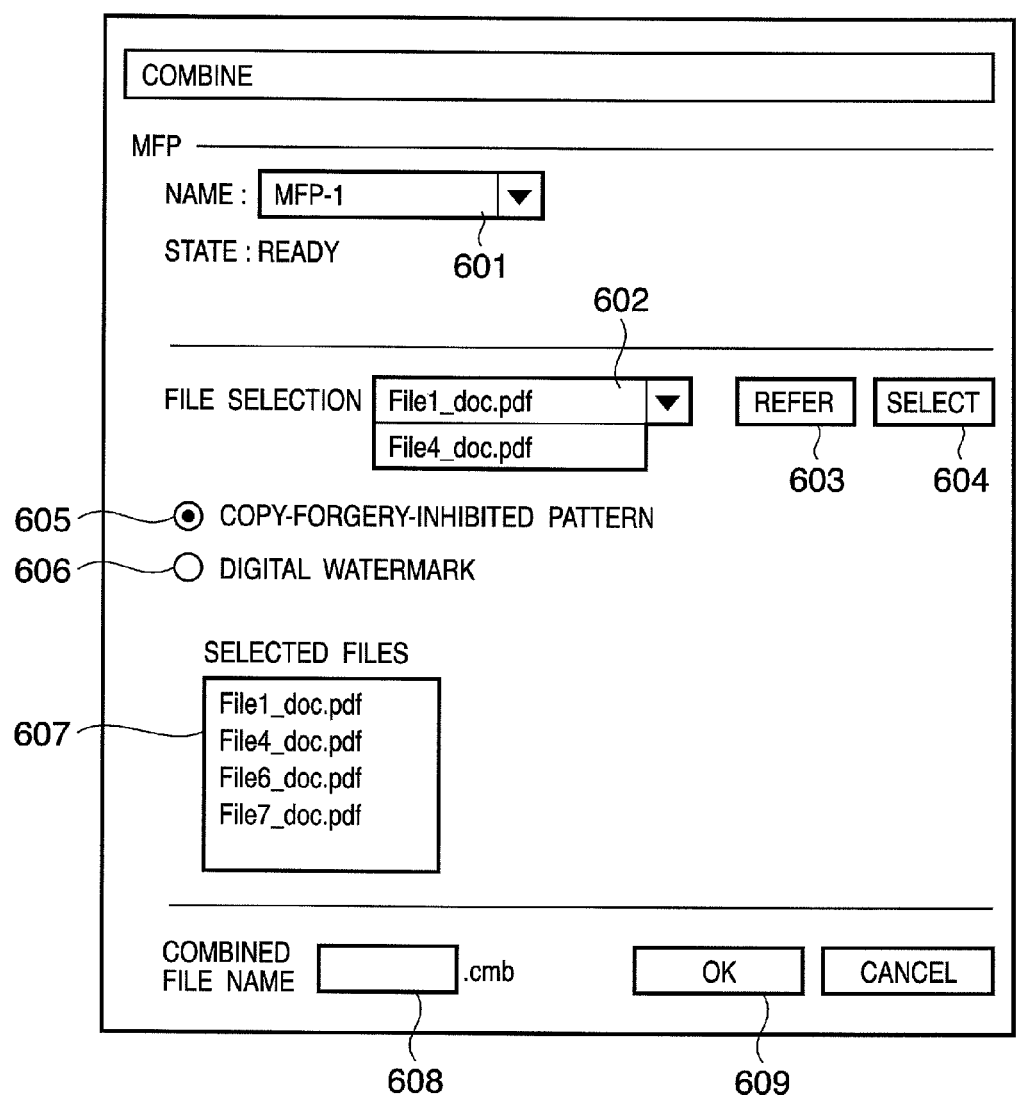
FIG. 6 is a view showing an example of the display of a GUI for designating, on the client terminal apparatus 203 side, images to be combined and the type of security process for the combined image.

FIG. 6 is a view showing an example of the display of a GUI for making the user on the client terminal apparatus 203 side to designate images to be combined and designate the type of security process for the combined image. Referring to FIG. 6, reference numeral 601 denotes a tab for selecting in which MFP images are to be combined. Designating this tab will display a menu displaying a list of the names of MFPs which can communicate with the client terminal apparatus 203. Therefore, selecting one of the MFP names displayed on this menu makes it possible to designate an MFP which is holding images to be combined. Assume that in the case shown in FIG. 6, "MFP-1" has been selected, which is the MFP 204.

Reference numeral 602 denotes a tab for selecting combining target images. Selecting this tab will display a menu displaying a list of the names of files held in the currently selected MFP (the MFP 204 in this case).

When the operator designates the tab 601 and selects one of the MFP names, the CPU 801 requests the MFP with the selected MFP name (MFP 204) to acquire the file names of all image files stored in the hard disk 1107. Upon detecting this request, the CPU 1101 acquires the file names of all the image files stored in the hard disk 1107 and transmits them to the client terminal apparatus 203. Therefore, designating the tab 602 on the GUI in FIG. 6 makes it possible to display the list of the acquired file names, i.e., the list of the file names of all the image files stored in the hard disk 1107 which the MFP with the MFP name selected with the tab 601 has.

Selecting one of the file names from the menu displayed by designating the tab 602, and designating a reference button 603 will display the contents (i.e., the image) of the selected file in, for example, another window. In addition, designating a selection button 604 will confirm the selected image file as a combining target image and additionally display the file name of the image file in a region 607. The file names of image files confirmed in this manner are displayed in the region 607, and all these files are combining target image files which will be described below.

Reference numerals 605 and 606 denote check buttons for selecting a security process to be performed for one file obtained by combining the image files having the file names displayed in the region 607. That is, when the operator wants to protect the security of an combined image file by composing a copy-forgery-inhibited pattern image with the image file, he/she may designate the check button 605. When the operator wants to protect the security of this image file by embedding digital watermark information (composing a digital watermark image), he/she may designate the check button 606.

Reference numeral 608 denotes a region for inputting the file name of one file obtained by combining the image files having the file names displayed in the region 607.

Reference numeral 609 denotes an OK button. When the operator designates the OK button 609 after selecting the file names of combining target images, the file name of one file obtained by combining them, and the type of security process to be performed for this one file by using the GUI in FIG. 6, the CPU 801 transmits the contents set by using the GUI in FIG. 6 to the destination designated with the tab 601, i.e., the MFP 204.

Upon receiving the setting information set by using the GUI in FIG. 6 from the client terminal apparatus 203 and detecting the information, the CPU 1101 of the MFP 204 loads, into the RAM 1102, the image files (the image files whose file names are displayed in the region 607), of the plurality of image files stored in the hard disk 1107, which are confirmed as combining target images, and combines the loaded image files. Referring to FIG. 4, the created combined image file is a file 407 (file name "Gattai.cmb"). The CPU 1101 then performs the security process designated by one of the check buttons 605 and 606 with respect to one image file (combined image file) obtained by combining the above files.

If the designated security process is the process of composing and adding a copy-forgery-inhibited pattern image, the CPU 1101 performs the process of adding a predetermined character sequence to the combined image file. Since information associated with such copy-forgery-inhibited pattern superimposition is created in advance and defined by a text file stored in the hard disk 1107, it suffices to use this text file at the time of copy-forgery-inhibited pattern superimposition.

If, however, the text files stored in the hard disk 1107 in association with the combining target image files designated by using the GUI in FIG. 6 include text files describing the execution of a security process by copy-forgery-inhibited pattern superimposition, it suffices to select one of such text files and perform a security process for a combined image file.

If the designated security process is the process of embedding digital watermark information (i.e., composing a digital watermark image), the CPU 1101 performs the process of embedding predetermined digital watermark information in the combined image file. Since information associated with such an embedding process is defined by a text file created in advance and stored in the hard disk 1107, it suffices to use this text file at the time of the embedding process.

If, however, the text files stored in the hard disk 1107 in association with the combining target image files designated by using the GUI in FIG. 6 include text files describing the execution of a security process by embedding digital watermark information, it suffices to select one of such text files and perform a security process for a combined image file.

Figure 12A:
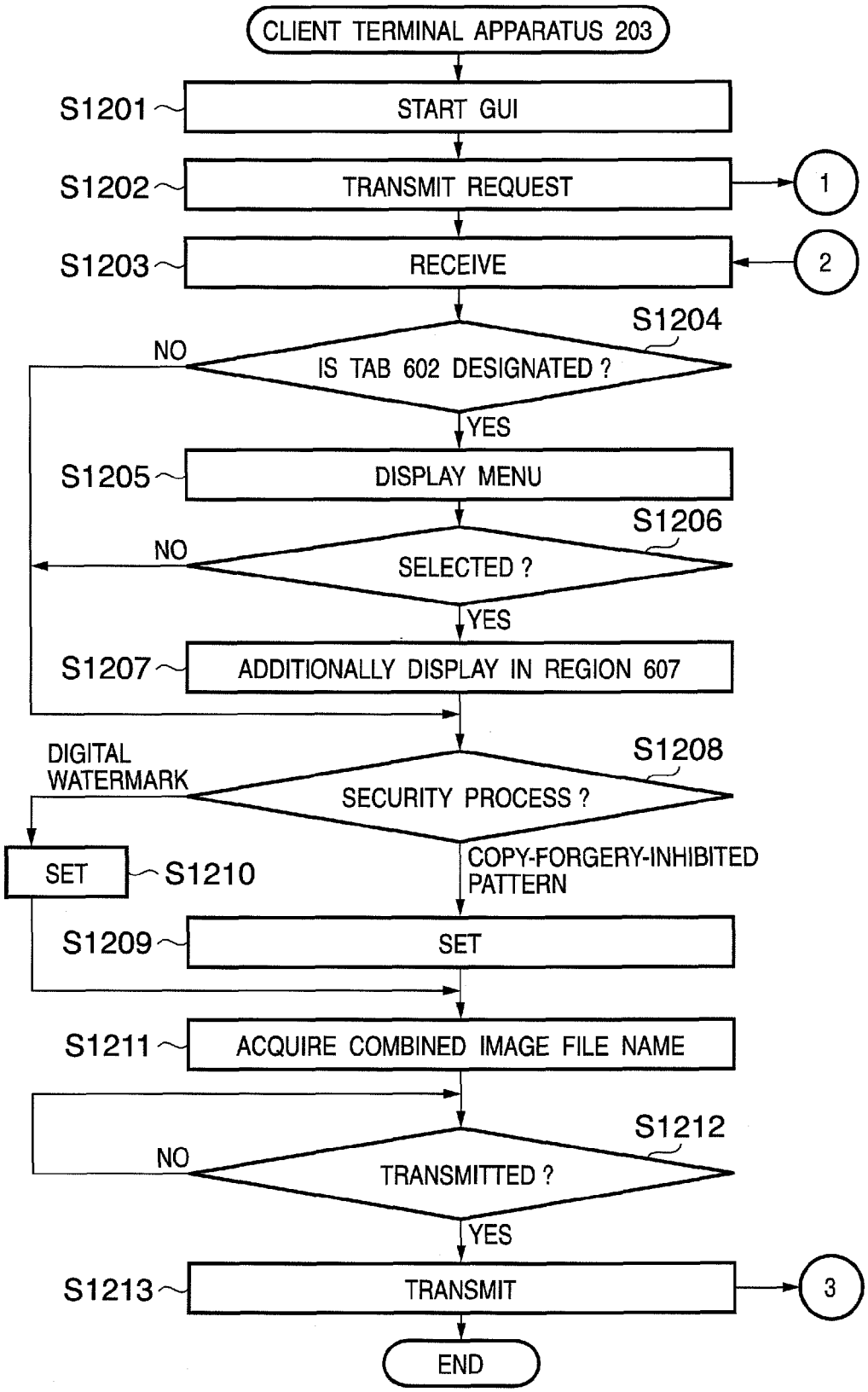
FIGS. 12A and 12B are flowcharts showing processes to be performed by a client terminal apparatus 203 and the MFP 204, respectively, when combining desired image files of the image files registered in the MFP 204 and performing a desired security process for the combined image file.
Figure 12B:
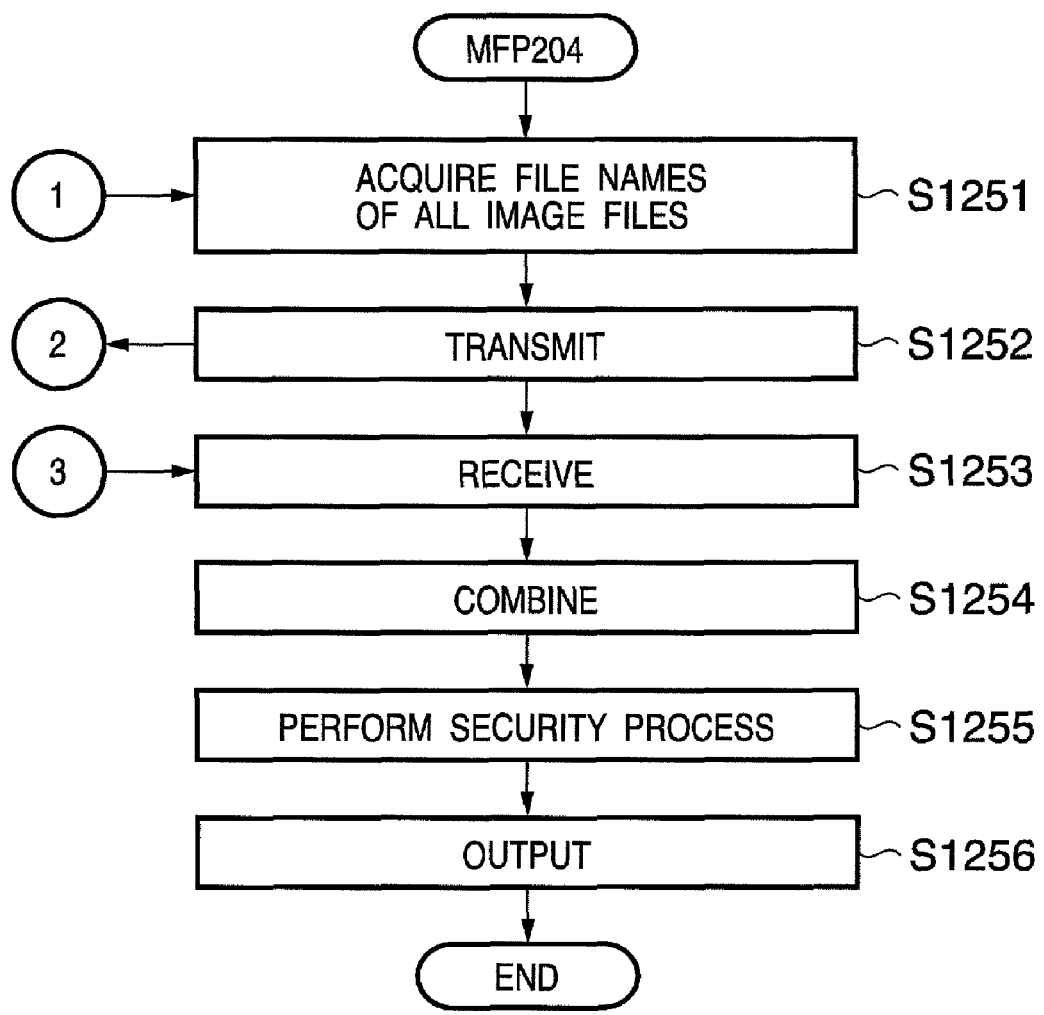

FIGS. 12A and 12B are flowcharts showing the processes to be performed by the client terminal apparatus 203 and the MFP 204, respectively, when combining desired image files of the image files registered in the MFP 204 and performing a desired security process for a combined image file. The external storage device 806 stores a program and data for making the CPU 801 execute processing (steps S1201 to S1213) performed by the client terminal apparatus 203 in the flowcharts in FIGS. 12A and 12B. The program and data are loaded into the RAM 802 under the control of the CPU 801. The CPU 801 performs processing by using them. As a consequence, the client terminal apparatus 203 executes steps S1201 to S1213 to be described below.

The ROM 1103 and the hard disk 1107 store a program and data for making the CPU 1101 execute processing (steps S1251 to S1256) performed by the MFP 204. The program and data are loaded into the RAM 1102 under the control of the CPU 1101, as needed. The CPU 1101 performs processing by using them. As a consequence, the MFP 204 executes steps S1251 to S1256 to be described below.

When the operator of the client terminal apparatus 203 inputs an instruction to start the GUI shown in FIG. 6 by using the operation unit 804, the CPU 801 detects this, loads a program and data associated with this GUI, which are stored in the external storage device 806, into the RAM 802, and executes processing (step S1201). With this operation, the display unit 805 displays the GUI shown in FIG. 6.

When the operator designates the tab 601 on the GUI in FIG. 6 and selects the MFP 204, the CPU 801 transmits a request to the MFP 204 to acquire the file names of all the image files stored in the hard disk 1107 of the MFP 204 (step S1202).

Upon detecting this request, the CPU 1101 of the MFP 204 acquires the file names of all the image files stored in the hard disk 1107 (step S1251), and transmits the acquired image file names to the client terminal apparatus 203 (step S1252).

The CPU 801 of the client terminal apparatus 203 receives the image file names and loads them into the RAM 802 (step S1203). The CPU 801 then checks whether the tab 602 is designated (step S1204). If it is determined as a result of this check that the tab 602 is not designated, the process advances to step S1208. If it is determined that the tab 602 is designated, the process advances to step S1205 to make the display unit 805 display a menu displaying the list of image file names loaded into the RAM 802 in step S1203 (step S1205).

If none of the image file names displayed on this menu is selected, the process advances to step S1208 through step S1206. If any one of them is selected, the process advances to step S1207 through step S1206 to additionally display the selected image file name in the region 607 (step S1207). If the CPU 801 checks (step S1208) whether the check button 605 or 606 is selected, and determines that the check button 605 is selected, i.e., the process using a copy-forgery-inhibited pattern is selected as a security process, the flow advances to step S1209 to set a command to compose a copy-forgery-inhibited pattern image, e.g., a "command to add copy-forgery-inhibited pattern [copy inhibition]" (step S1209). If the check button 606 is selected, i.e., the process using digital watermark information is set as a security process, the flow advances to step S1210 to set a command to use digital watermark information, e.g., a "command to embed digital watermark information (compose a digital watermark image)" (step S1210).

If the file name of the combined image file is input to the region 608, the CPU 801 acquires this (step S1211). The CPU

801 then checks whether the OK button 609 is designated (step S1212). If this button is designated, the process advances to step S1213 to transmit various kinds of information set by using the GUI in FIG. 6 to the MFP 204 (step S1213).

Upon receiving information transmitted from the client terminal apparatus 203, the CPU 1101 of the MFP 204 loads the information into the RAM 1102 (step S1253). The CPU 1101 loads, into the RAM 1102, image files (the image files having the file names displayed in the region 607), of the image files held in the hard disk 1107, which are confirmed as combining target images by referring to the acquired information, and combines them (step S1254). The file name of the combined image file is the file name acquired from the region 608.

The CPU 1101 performs the security process designated with one of the check buttons 605 and 606 with respect to the combined image file by referring to the information loaded into the RAM 1102 in step S1253 (step S1255). In this security process, the CPU 1101 composes a copy-forgery-inhibited pattern image or embeds digital watermark information (composes a digital watermark image). When superimposing a copy-forgery-inhibited pattern, the CPU 1101 adds a predetermined character sequence to the combined image file. On the other hand, when embedding digital watermark information (composing a digital watermark image), the CPU 1101 embeds predetermined digital watermark information in the combined image file (composes a digital watermark image).

The MFP 204 then outputs the combined image file to which the security process has been performed to the output destination designated by the client terminal apparatus 203 (step S1256). Such output destinations include the printer unit 108 and the display unit 110. If not specifically designated, the MFP 204 may register the combined image file, to which the security process has been performed, in the hard disk 1107 again.

In addition, the combined image file is finally stored in the hard disk 1107. When this combined image file is to be stored, it is necessary to add information for specifying the security process which has been executed for the combined image file. When the combined image file is to be stored, therefore, the text file used to perform the security process for the combined image file is associated with the combined image file.

[Second Embodiment]

The first embodiment has exemplified the two security processes, i.e., the process of composing a copy-forgery-inhibited pattern image and the process of composing a digital watermark image. However, other processes can be used as security processes. For example, an encrypting technique may be used. Such encrypting techniques include, for example, a technique of encrypting an image by using a known Hash function.

In order to select one of the process of composing a copy-forgery-inhibited pattern image, the process of composing a digital watermark image, and the process of encrypting as a security process to be performed for an image to be registered in an MFP 204, it suffices to set a corresponding check box on the GUI in FIG. 3. This allows the operator to select an encrypting technique in addition to the process of composing a copy-forgery-inhibited pattern image and the process of composing a digital watermark image as a security process to be performed for an image to be registered in the MFP 204.

In addition, in order to select one of the process of composing a copy-forgery-inhibited pattern image, the process of composing a digital watermark image, and the process of encrypting as a security process to be performed for a combined image file, it suffices to set a corresponding check box on the GUI in FIG. 6. This allows the operator to select an encrypting technique in addition to the process of composing a copy-forgery-inhibited pattern image and the process of composing a digital watermark image as a security process to be performed for a combined image file. Note that in this case, it is necessary to create a text file describing information associated with an encrypting process (e.g., an encrypting scheme and parameters associated with it). This text file is used for an encrypting process.

[Third Embodiment]

In the first embodiment, the operator of the client terminal apparatus 203 selects combining target images from the images registered in the MFP 204 and the type of security process to be performed for a combined image file. However, the operator may perform these selecting operations by using a touch panel window 1104 which an MFP 204 has.

If, for example, the operator of the MFP 204 wants to combine two or more desired images of the image group (the plurality of images) registered in the MFP 204 and also wants to perform a desired security process for a combined image file, he/she operates the touch panel window 1104 and a button group 1106 to input an instruction to display, on the touch panel window 1104, a GUI obtained by omitting the tab 601 from the GUI in FIG. 6. This makes a CPU 1101 display the designated GUI.

When the operator selects combining target images by using such a GUI and the type of security process by using the touch panel window 1104 and the button group 1106 and designates an OK button 609, the CPU 1101 performs the processing in steps S1254 to S1256.

As describe above, an external apparatus from the viewpoint of the MFP 204, e.g., the client terminal apparatus 203, may perform the above selecting operations. However, it suffices to perform such operations by using an operation interface which the MFP 204 has.

[Fourth Embodiment]

The first embodiment selects and determines the process of composing a copy-forgery-inhibited pattern image or the process of composing a digital watermark image as a security process for a combined image file regardless of the type of security process set for each of combining target images.

In this embodiment, when the user selects one of the text files held in a hard disk 1107 in association with combining target image files to perform a security process for a combined image file, the selected text file is set to be associated with the remaining combining target image files. That is, the processing based on the text file selected by the user becomes a security process for a combined image file.

Figure 13:
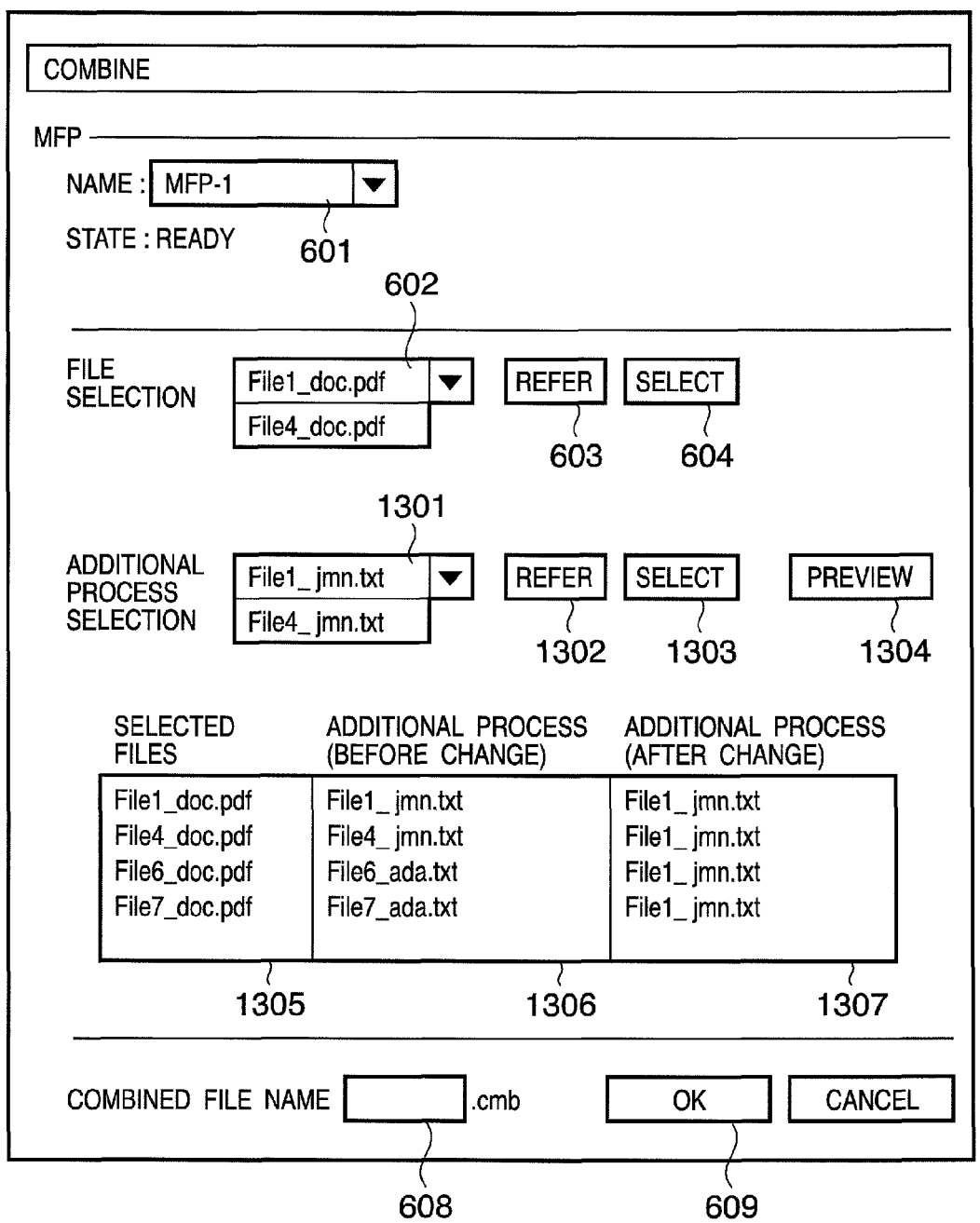
FIG. 13 is a view showing an example of the display of a GUI for selecting the type of security process for a combined image file on the GUI shown in FIG. 6 by selecting one of the text files held in a hard disk 1107 in association with combining target image files.

FIG. 13 is a view showing a GUI for making the user select one of the text files held in the hard disk 1107 in association with combining target image files so as to select the type of security process for a combined image file on the GUI shown in FIG. 6. The same reference numerals as in FIG. 6 denote the same parts in FIG. 13, and a description thereof will be omitted.

Referring to FIG. 13, reference numeral 1301 denotes a tab. Designating the tab 1301 makes it possible to display a menu displaying a list of the file names of text files held in the hard disk 1107 in association with all the image files (the image files additionally displayed in a region 1305, i.e., the four image files File1_doc.pdf, File4_doc.pdf, File6_doc.pdf, and File7_doc.pdf) which are currently confirmed as combining target images.

When the user selects one text file from the menu displayed upon designation of the tab 1301 and designates a reference button 1302, the contents of the selected text file are displayed in, for example, another window.

When the user designates a selection button 1303, the selected text file is confirmed as a text file to be used instead of the four text files described above, and the file name of the confirmed text file is displayed in a region 1307. This confirmed text file is a text file to be used when a security process is performed for a combined image file.

In this case, as in the region 607 in FIG. 6, in the region 1305, the file names of the four image files currently confirmed as combining target images are displayed. In a region 1306, text files (the four text files File1_jmn.txt, File4_jmn.txt, File6_jmn.txt, and File7_jmn.txt in FIG. 13) respectively associated with the fourth image files are displayed.

As described above, when the user selects a new text file from the menu displayed by designating the tab 1301 instead of the four text files described above and then designates the selection button 1303, the text file (File1_jmn.txt in FIG. 13) is confirmed instead of the four text files and is displayed in the region 1307.

As described above, in this embodiment, the user selects one of the text files associated with combining target images as a text file to be used for a security process performed for a combined image file. If, therefore, there is at least one of combining target images for which the process of composing a copy-forgery-inhibited pattern image is set, the user can select the process of composing a copy-forgery-inhibited pattern image as a security process for a combined file. If, however, there is no image among the combining target images for which the process of composing a copy-forgery-inhibited pattern image is set, the user cannot select the process of composing a copy-forgery-inhibited pattern image as a security process for a combined file.

Referring to FIG. 13, reference numeral 1304 denotes a preview button. When the user designates the preview button 1304, the image file currently selected with a tab 602 is rasterized into an image. The security process selected with the tab 1301 is then performed for the raster image, and the resultant image is displayed in, for example, another window.

In this embodiment as well, the hard disk 1107 stores the combined image file. When storing this combined image file, however, it is necessary to add information for specifying which type of security process has been performed for the combined image file. When a combined image file is to be stored, therefore, a text file used for a security process for the combined image file is associated with the combined image file.

In addition, this embodiment allows the user to select one of a plurality of types of security processes and also allows the user to select one of a plurality of security processes. This will be described more comprehensively by taking an example.

Assume that a first process is applied to a first image, and a second process is applied to a second image. In this case, this embodiment has disclosed a technique of allowing the user to select any one of the first and second processes upon combining the first and second images. With this technique, when setting information for composing a first copy-forgery-inhibited pattern image (an embedded character sequence: copy inhibition, color: cyan) with the first image is set together with second setting information for composing a second copy-forgery-inhibited pattern image (an embedded character sequence: invalid, color: magenta) with the second image, one of the copy-forgery-inhibited pattern images is composed with an combined image. This can prevent copy-forgery-inhibited pattern images of different colors from being composed with different pages of a combined image. That is, this can prevent aesthetic deterioration.

Obviously, in this embodiment as well, when setting information for composing the first copy-forgery-inhibited pattern image with the first image is set together with second setting information for composing the second copy-forgery-inhibited pattern image (the embedded character sequence: invalid, color: magenta) with the second image, either a copy-forgery-inhibited pattern image or a digital watermark image is composed with a combined image.

Obviously, when combining an image obtained by encrypting any one of combining target images (an image with which an encrypting process is associated as a text file) with another image, it is necessary to combine the encrypted image with another image upon decoding the encrypted image. This applies to other embodiments.

All the above embodiments have been described on the assumption that some types of security processes are applied to all combining target images. For this reason, when the first and second images are to be combined, setting has been made to apply some types of security processes to both the first image and the second image.

In the present invention, however, there is no need to apply some types of security processes to all combining target images, and it suffices to make setting to apply a security process to any one of combining target images. For example, it suffices to make setting to compose a copy-forgery-inhibited pattern image with the first image while making setting to apply no security process to the second image.

In such a case, obviously, the first and second images are combined after setting is made to compose a copy-forgery-inhibited pattern image, set for the first image, with the second image. This is because the GUI in FIG. 6 allows the user to only select a copy-forgery-inhibited pattern image composing process as a security process to be selected.

Figure 14A:
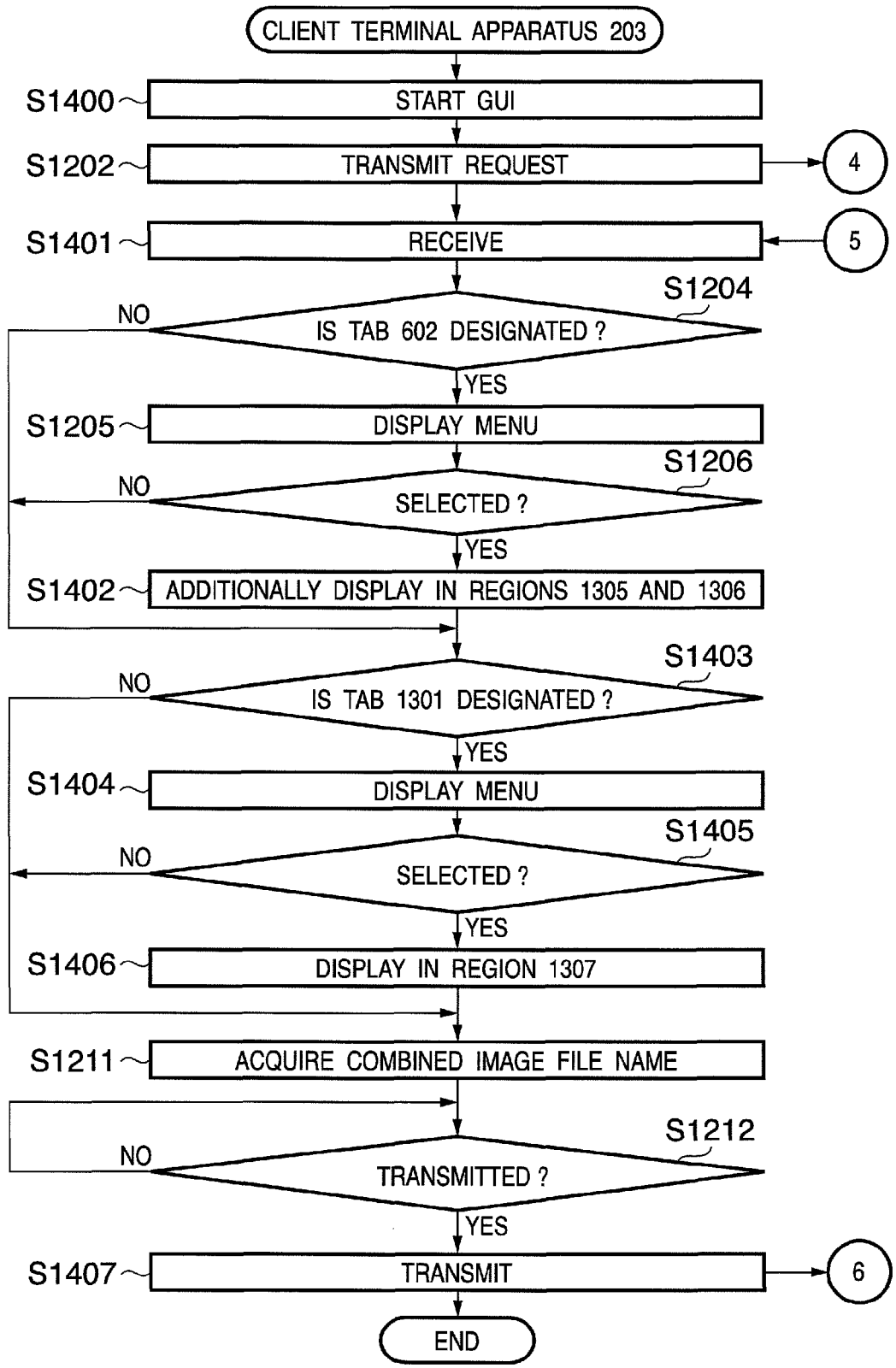

FIGS. 14A and 14B are flowcharts showing the processes to be performed by a client terminal apparatus 203 and an MFP 204, respectively, when combining desired image files of the image files registered in the MFP 204 and performing a desired security process for a combined image file.

An external storage device 806 stores a program and data for making a CPU 801 execute processing performed by the client terminal apparatus 203 in the flowcharts in FIGS. 14A and 14B. The program and data are loaded into a RAM 802 under the control of the CPU 801. The CPU 801 performs processing by using them.

A ROM 1103 and a hard disk 1107 store a program and data for making a CPU 1101 execute processing performed by the MFP 204. The program and data are loaded into a RAM 1102 under the control of the CPU 1101. The CPU 1101 performs processing by using them.

When the operator of the client terminal apparatus 203 inputs an instruction to start the GUI shown in FIG. 13 by using an operation unit 804, the CPU 801 detects this, loads a program and data associated with this GUI, which are stored in the external storage device 806, into the RAM 802, and executes processing (step S1401). With this operation, a display unit 805 displays the GUI shown in FIG. 13.

When the operator designates a tab 601 on the GUI in FIG. 13 and selects the MFP 204, the CPU 801 transmits a request to the MFP 204 to acquire the file names of all the image files stored in the hard disk 1107 of the MFP 204 (step S1202).

Upon detecting this request, the CPU 1101 of the MFP 204 acquires the file names of all the image files stored in the hard disk 1107 and the file names of text files stored in the hard disk 1107 in association with the respective image files (step S1451), and transmits the acquired image file names and text file names to the client terminal apparatus 203 (step S1452).

The CPU 801 of the client terminal apparatus 203 receives the image file names and loads them into the RAM 802 (step S1401). The CPU 801 then checks whether the tab 602 is designated (step S1204). If it is determined as a result of this check that the tab 602 is not designated, the process advances to step S1403. If it is determined that the tab 602 is designated, the process advances to step S1401 to make the display unit 805 display a menu displaying the list of image file names loaded into the RAM 802 in step S1401 (step S1205).

If none of the image file names displayed on this menu is selected, the process advances to step S1403 through step S1206. If any one of them is selected, the process advances to step S1402 through step S1206.

In step S1402, the CPU 801 additionally displays the selected image file name in the region 1305 and also additionally displays the text file name loaded into the RAM 802 in step S1401 as a text file name associated with the image file with the selected image file name in a corresponding portion in the region 1306 (step S1402).

The CPU 801 checks whether the tab 1301 is designated (step S1403). If it is determined as a result of this check that the tab 1301 is designated, the process advances to step S1211. If it is determined that the tab 1301 is designated, the process advances to step S1404 to make the display unit 805 display a menu displaying a list of the text file names loaded into the RAM 802 in step S1401 (step S1404).

If none of the text file names displayed on this menu is selected, the process advances to step S1211 through step S1405. If any one of them is selected, the process advances to step S1406 through step S1405.

In step S1406, the CPU 801 displays the selected text file name in the region 1307 (step S1406).

If the file name of the combined image file is input to a region 608, the CPU 801 acquires this (step S1211). The CPU 801 then checks whether an OK button 609 is designated (step S1212). If this button is designated, the process advances to step S1407 to transmit various kinds of information set by using the GUI in FIG. 13 to the MFP 204 (step S1407).

Upon receiving information transmitted from the client terminal apparatus 203, the CPU 1101 of the MFP 204 loads the information into the RAM 1102 (step S1453).

The CPU 801 then refers to the information loaded into the RAM 1102 in step S1453 to determine whether there is an image file, of the image files confirmed as combining target images (the image files having the file names displayed in the region 1305), which is associated with the text file selected with the tab 1301 (the text file of the text file name received from the client terminal apparatus 203 in step S1453) (step S1454).

That is, the CPU 801 determines whether there is an image file, of the plurality of images, for which a security image designated as a combining target for each of a plurality of images for which a combining instruction has been issued (a security image as a combining target indicated by the text file having the text file name received from the client terminal apparatus 203 in step S1453, e.g., a copy-forgery-inhibited pattern image or a digital watermark image) is set in advance as a combining target.

If it is determined that there is no such image file, the process advances to step S1456. If there is such an image file, the process advances to step S1455.

In step S1455, the CPU 801 associates this text file with an image file, of the image files confirmed as combining target images, which is not associated with the text file selected with the tab 1301. That is, the CPU 801 makes setting to compose a security image (a security image as a combining target indicated by the text file having the text name received from the client terminal apparatus 203 in step S1453) with an image file, of the image files confirmed as combining target images, which is not associated with the text file selected with the tab 1301, and output the resultant data.

In step S1456, the CPU 801 loads image files, of the image files held in the hard disk 1107, which are confirmed as combining target images into the RAM 1102, and combines them (step S1254). The file name of the combined image file is the file name acquired from the region 608.

In addition, the CPU 801 refers to the information loaded into the RAM 1102 in step S1453 and performs a security process for the combined image file in accordance with the text file selected with the tab 1301 (the text file having the text file name received from the client terminal apparatus 203 in step S1453) (step S1455).

The CPU 801 then outputs the combined image file to which the security process has been performed to the output destination designated by the client terminal apparatus 203 (step S1256). Such output destinations include the printer unit 108 and display unit 110. If not specified, the CPU 801 may register, in the hard disk 1107 again, the combined image file to which the security process has been performed.

Furthermore, the combined image file is finally stored in the hard disk 1107. When this combined image file is to be stored, it is necessary to add information for specifying the security process which has been executed for the combined image file. When the combined image file is to be stored, therefore, the text file used to perform the security process for the combined image file is associated with the combined image file.

[Fifth Embodiment]

In this embodiment, the text files registered in an MFP 204 are uploaded to a client terminal apparatus 203, and the client terminal apparatus 203 creates one text file by using a plurality of such text files, and uploads the file to the MFP 204 again. This makes it possible to edit the data registered in the MFP 204 again.

Figure 7:
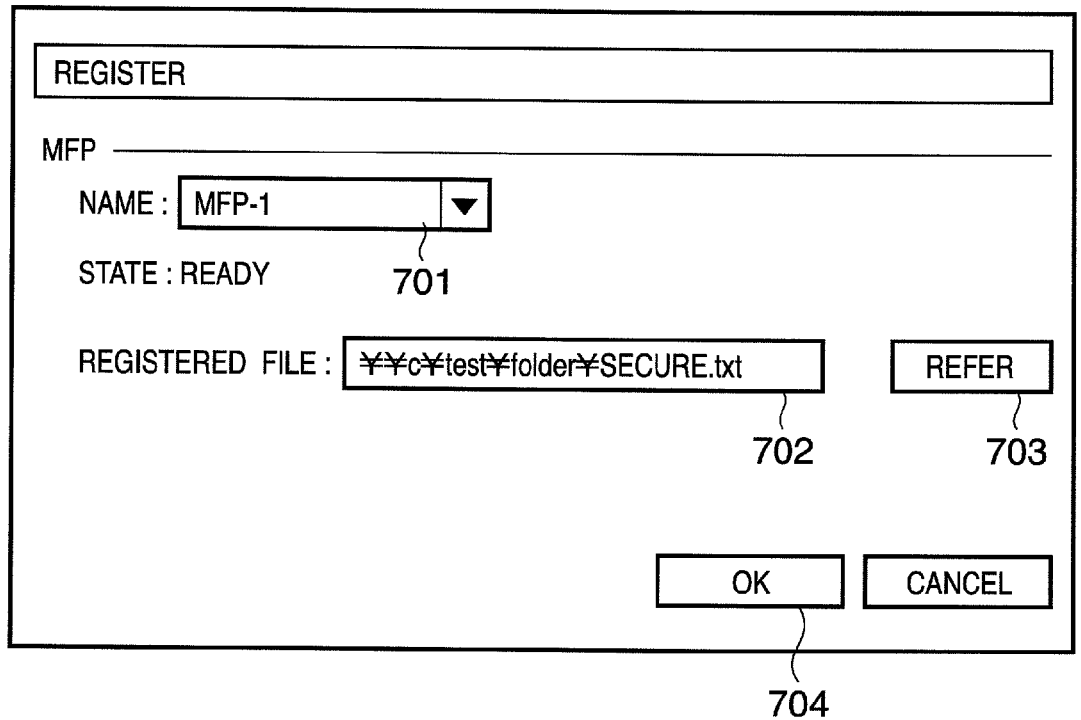
FIG. 7 is a view showing an example of the display of a GUI for registering a text file in the MFP 204.

FIG. 7 is a view showing an example of the display of a GUI for registering a text file in the MFP 204. The GUI shown in FIG. 7 is used to register, in the MFP 204, a new text file created by using a plurality of text files uploaded from the MFP 204 (which may be newly created instead of being uploaded).

Referring to FIG. 7, reference numeral 701 denotes a tab. Designating this tab will display a menu for displaying a list of the names of MFPs which can communicate with the client terminal apparatus 203. Reference numeral 702 denotes a region for inputting a path for a text file to be registered. Since an external storage device 806 temporarily stores the text file created on the client terminal apparatus 203 side, a storage path is input to the region 702.

Reference numeral 703 denotes a reference button. Designating this button will show a window depicting a hierarchical directory structure in the external storage device 806. Performing known operation using the window makes it possible to select a desired file.

Reference numeral 704 denotes an OK button. Designating the OK button 704 upon determining a registration destination and a text file to be registered by using the GUI in FIG. 7 causes the client terminal apparatus 203 to transmit the text file to be registered to the registration destination.

[Other Embodiment]

Obviously, the object of the present invention is achieved in the following manner. That is, a recording medium (or a storage medium) storing software program codes for implementing the functions of the above embodiments is supplied to a system or apparatus. The computer (or the CPU or MPU) of the system or apparatus reads out and executes the program codes stored in the recording medium. In this case, the program codes read out from the recording medium implement the functions of the above embodiments by themselves, and the recording medium storing the program codes constitutes the present invention.

An operating system (OS) or the like operating on the computer executes part or all of actual processing on the basis of the instructions of the program codes by executing the program codes read out by the computer. Obviously, the present invention incorporates a case wherein the functions of the above embodiments are implemented by the processing.

Assume that the program codes read out from the recording medium are written in a memory built in a feature expansion card inserted in the computer or a feature expansion unit connected to the computer. Obviously, the present invention incorporates a case wherein the CPU or the like built in the feature expansion card or feature expansion unit performs part or all of actual processing on the basis of the instructions of the program codes, and the functions of the above embodiments are implemented by the processing.

When the present invention is applied to the above recording medium, the recording medium stores program codes corresponding to the flowcharts described above. Each embodiment described above has mainly exemplified the arrangement configured to make the user select one of a plurality of security processes for a plurality of images for which the plurality of security processes are to be respectively executed. However, the present invention is not limited to this. For example, the present invention may incorporate an arrangement configured to make the user select some of a plurality of security processes for a plurality of images for which the plurality of security processes are to be respectively executed. Assume that encrypting processing has been performed for the first image, and setting is made to compose a copy-forgery-inhibited pattern image with the second image. In this case, first of all, the first image is reconstructed upon being decoded, and the reconstructed first image is combined with the second image. This arrangement may be configured to perform encrypting processing after composing a copy-forgery-inhibited pattern image with the combined image.

Each embodiment described above has exemplified the case wherein the user is made to select a desired process from a plurality of security processes. However, the object of the present invention can be achieved even by an arrangement which is not configured to make the user select. For example, a storage means stores information indicating that security levels increase in the order of process of composing copy-forgery-inhibited pattern image>process of composing digital watermark image>encrypting process. When combining a plurality of images, the CPU may select which security process is executed for a combined image, upon determining which one of the security processes set for the respective images has the highest security level. Although the order of security levels is exemplified as follows: process of composing copy-forgery-inhibited pattern image>process of composing digital watermark image>encrypting process, the order is not limited to this. This is because different users and managers will consider the respective processing techniques in different manners.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-370894, filed 22 Dec. 2005, which is hereby incorporated by reference herein in its entirety.

What is claimed is:

1. A processing apparatus comprising:
an image selection unit that selects a first image and a second image according to a user's instruction;
a processing unit that applies a security processing relating to one of the selected first image or the selected second image to both the selected first image and the selected second image.

2. The processing apparatus according to claim 1, further comprising:
a processing selection unit that selects the security processing relating to one of the selected first image the selected second image,
wherein the processing unit applies the selected security processing to both the selected first image and the selected second image.

3. The processing apparatus according to claim 1, further comprising:
a combination unit that combines the selected first image and the selected second image to generate a third image,
wherein the processing unit applies the security processing to the generated third image.

4. The processing apparatus according to claim 2, further comprising:
a combination unit that combines the selected first image and the selected second image to generate a third image,
wherein the processing unit applies the selected security processing to the generated third image.

5. A method of processing images for a processing apparatus having a processing unit, the method comprising:
an image selection step of selecting a first image and a second image according to a user's instruction; and
a processing step of applying a security processing relating to one of the selected first image or the selected second image to both the selected first image and the selected second image using the processing unit.

6. The method according to claim 5, further comprising:
a processing selection step of selecting the security processing relating to one of the selected first image or the selected second image,
wherein the processing step applies the selected security processing to both the selected first image and the selected second image using the processing unit.

7. The method according to claim 5, further comprising:
a combining step of combining the selected first image and the selected second image to generate a third image,
wherein the processing step applies the security processing to the generated third image using the processing unit.

8. The method according to claim 6, further comprising:
a combining step of combining the selected first image and the selected second image to generate a third image,
wherein the processing step applies the selected security processing to the generated third image using the processing unit.

9. A non-transitory computer-readable storage medium storing a computer program executable by a processing apparatus having a processing unit for executing a method of processing images, the method comprising:
an image selection step of selecting a first image and a second image according to a user's instruction; and a processing step of applying a security processing relating to one of the selected first image or the selected second image to both the selected first image and the selected second image.

10. The non-transitory computer-readable storage medium according to claim 9, wherein the method further comprises:

a processing selection step of selecting the security processing relating to one of the selected first or second image, wherein the processing step applies the security processing to both the selected first image and the selected second image.

11. The non-transitory computer-readable storage medium according to claim 9, wherein the method further comprises:

a combining step of combining the selected first image and the selected second image to generate a third image, wherein the processing step applies the security processing to the generated third image.

12. The non-transitory computer-readable storage medium according to claim 10, wherein the method further comprises:

a combining step of combining the selected first image and the selected second image to generate a third image, wherein the processing step applies the selected security processing to the generated third image.

* * * * *